(12) United States Patent
Komitov

(10) Patent No.: US 7,876,385 B2
(45) Date of Patent: Jan. 25, 2011

(54) LIQUID CRYSTAL DEVICE

(76) Inventor: Lachezar Komitov, Landalabergen 26, SE-411 29 Göteborg (SE)

(*) Notice: Subject to any disclaimer, the term of this patent is extended or adjusted under 35 U.S.C. 154(b) by 606 days.

(21) Appl. No.: 11/711,032

(22) Filed: Feb. 27, 2007

(65) Prior Publication Data
US 2008/0204612 A1 Aug. 28, 2008

(51) Int. Cl.
*G02F 1/133* (2006.01)
(52) U.S. Cl. .............. 349/23; 349/19; 349/33; 349/141; 349/123; 349/178
(58) Field of Classification Search .......... 349/129, 349/33, 96, 172, 179, 141, 19, 123, 130, 349/133, 23, 178; 345/87, 38
See application file for complete search history.

(56) References Cited

U.S. PATENT DOCUMENTS

| 6,160,601 | A | 12/2000 | Sato |
| 6,233,034 | B1* | 5/2001 | Lee et al. ............ 349/141 |
| 6,678,027 | B2* | 1/2004 | Park et al. ........... 349/141 |
| 6,839,117 | B1 | 1/2005 | Park et al. |
| 2003/0063246 | A1 | 4/2003 | Bryan-Brown et al. |
| 2005/0179855 | A1* | 8/2005 | Helgee et al. ........ 349/172 |
| 2005/0270463 | A1 | 12/2005 | Akahane et al. |
| 2006/0126000 | A1 | 6/2006 | Choi et al. |

FOREIGN PATENT DOCUMENTS

| FR | 2587506 A1 | 6/1985 |
| JP | 10-161128 A | 6/1998 |
| WO | WO 00/03288 A1 | 1/2000 |
| WO | WO 03/081326 A1 | 10/2003 |
| WO | WO 2005/071477 A1 | 8/2005 |

OTHER PUBLICATIONS

Tae Bong Jung et al., "A hybrid aligned nematic reflective liquid crystal display driven by a fringe-field", Liquid Crystals, Taylor & Francis, Abingdon, GB, vol. 31, No. 10, Oct. 2004, 1393-1397, XP001201535ISSN: 0267-8292.
European Patent Office Communication pursuant to Article 94(3) EPC, dated Nov. 6, 2009.

* cited by examiner

*Primary Examiner*—Thoi V Duong
(74) *Attorney, Agent, or Firm*—Buchanan Ingersoll & Rooney PC

(57) ABSTRACT

The present invention relates to a liquid crystal device driven by a linear coupling, such as ferroelectric and/or flexoelectric coupling, between an inhomogenous in-plane electric field generated by an electrode pattern over a first sub-volume of the bulk layer adjacent to said electrode pattern and liquid crystals in a polarized state comprised in said first sub-volume and/or in an optional alignment layer applied on said electrode pattern said polarization being stronger than any possible similar liquid crystal polarization of the bulk layer outside said first sub-volume, said alignment layer, and/or a second sub-volume of the bulk layer adjacent the inner surface of the other substrate, or an optional second alignment layer or an optional electrode pattern applied thereon.

22 Claims, 37 Drawing Sheets

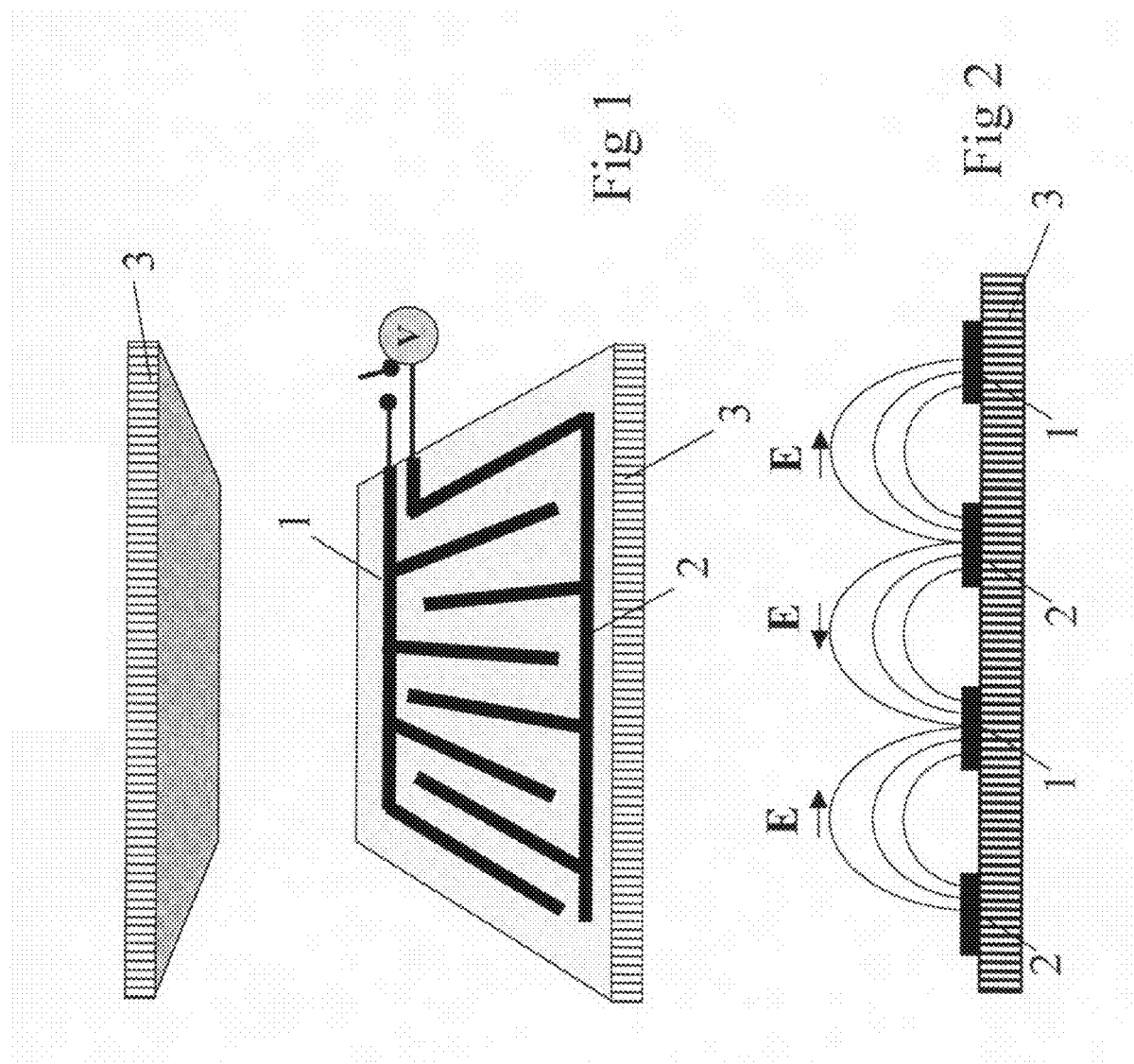

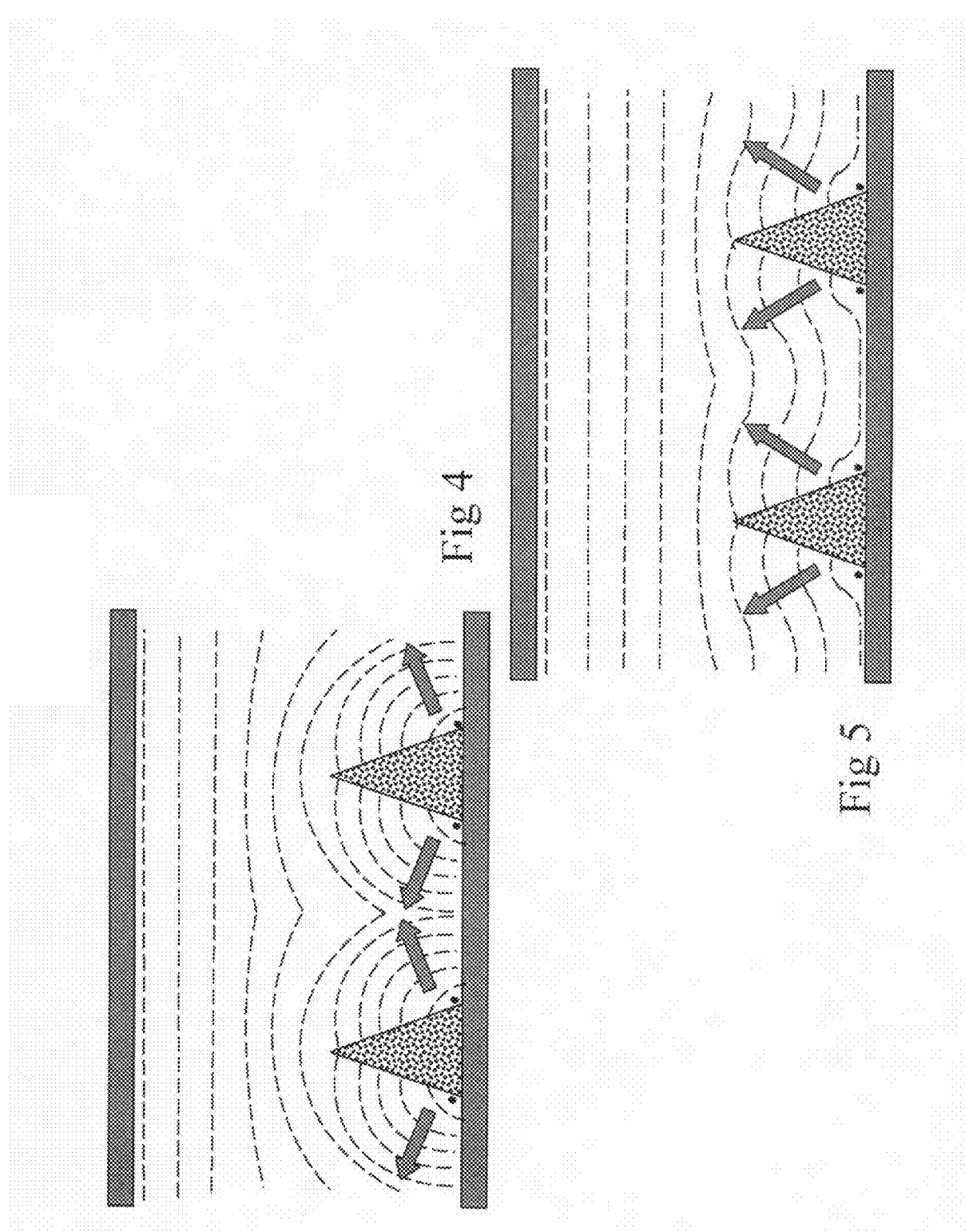

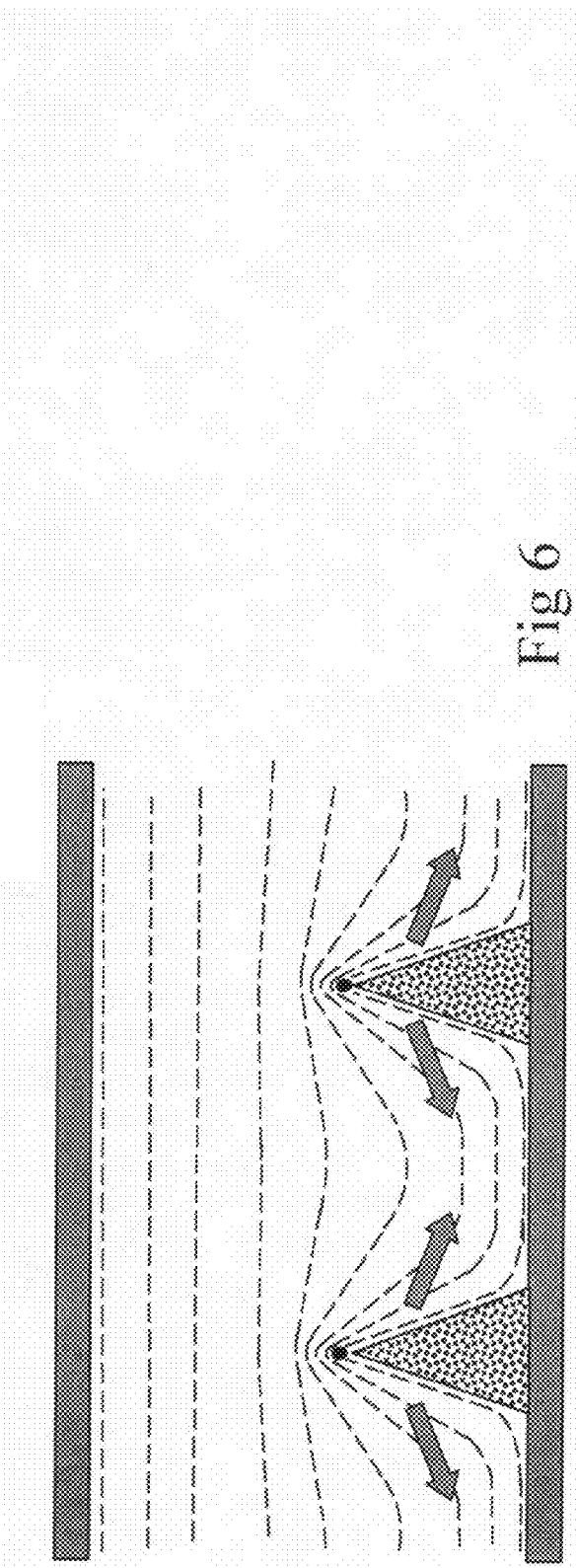
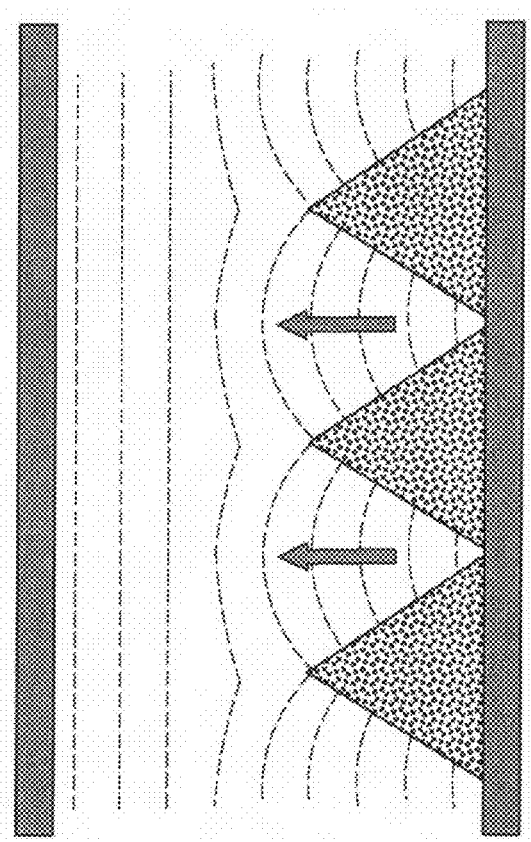
Fig 6
Fig 7

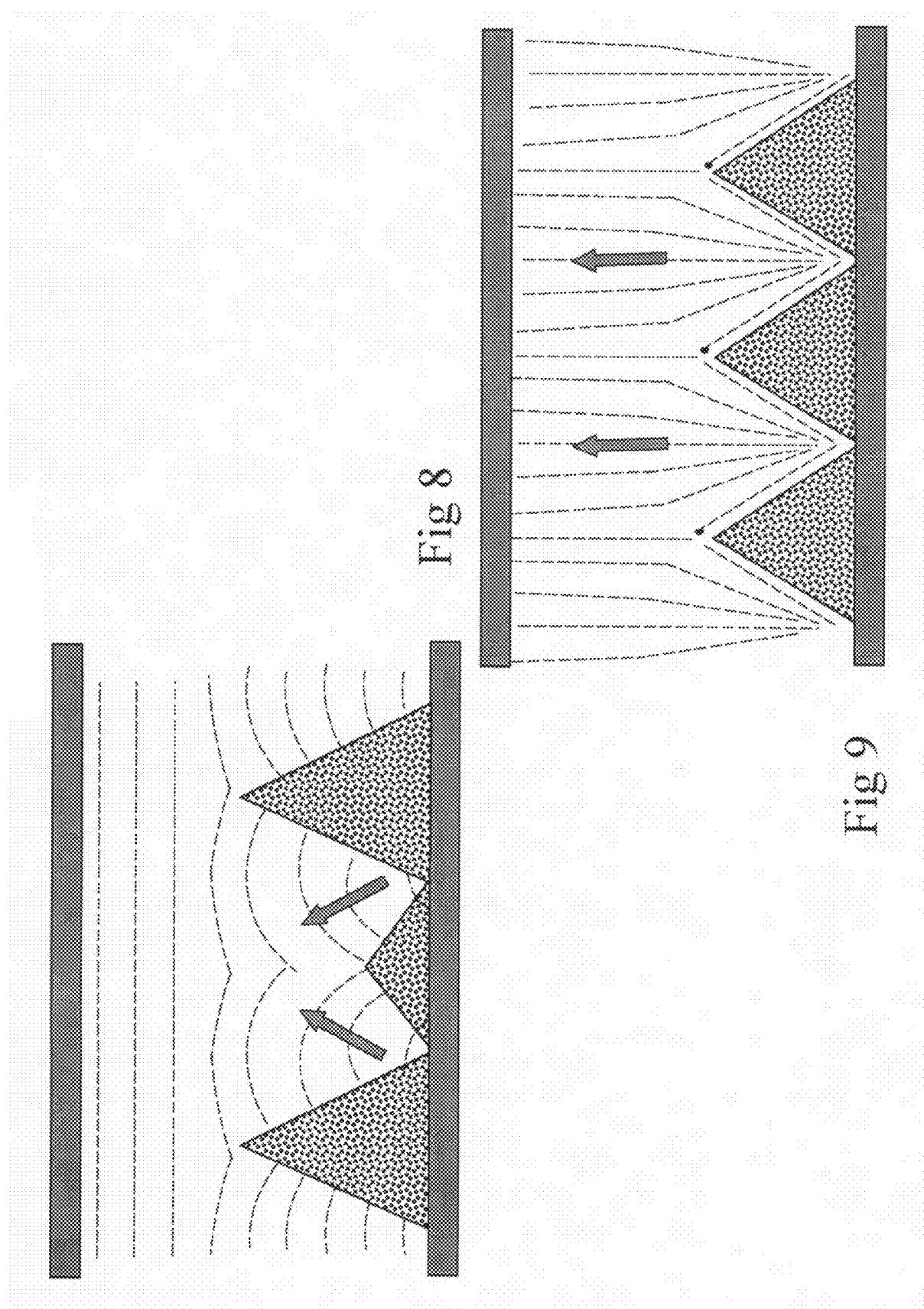

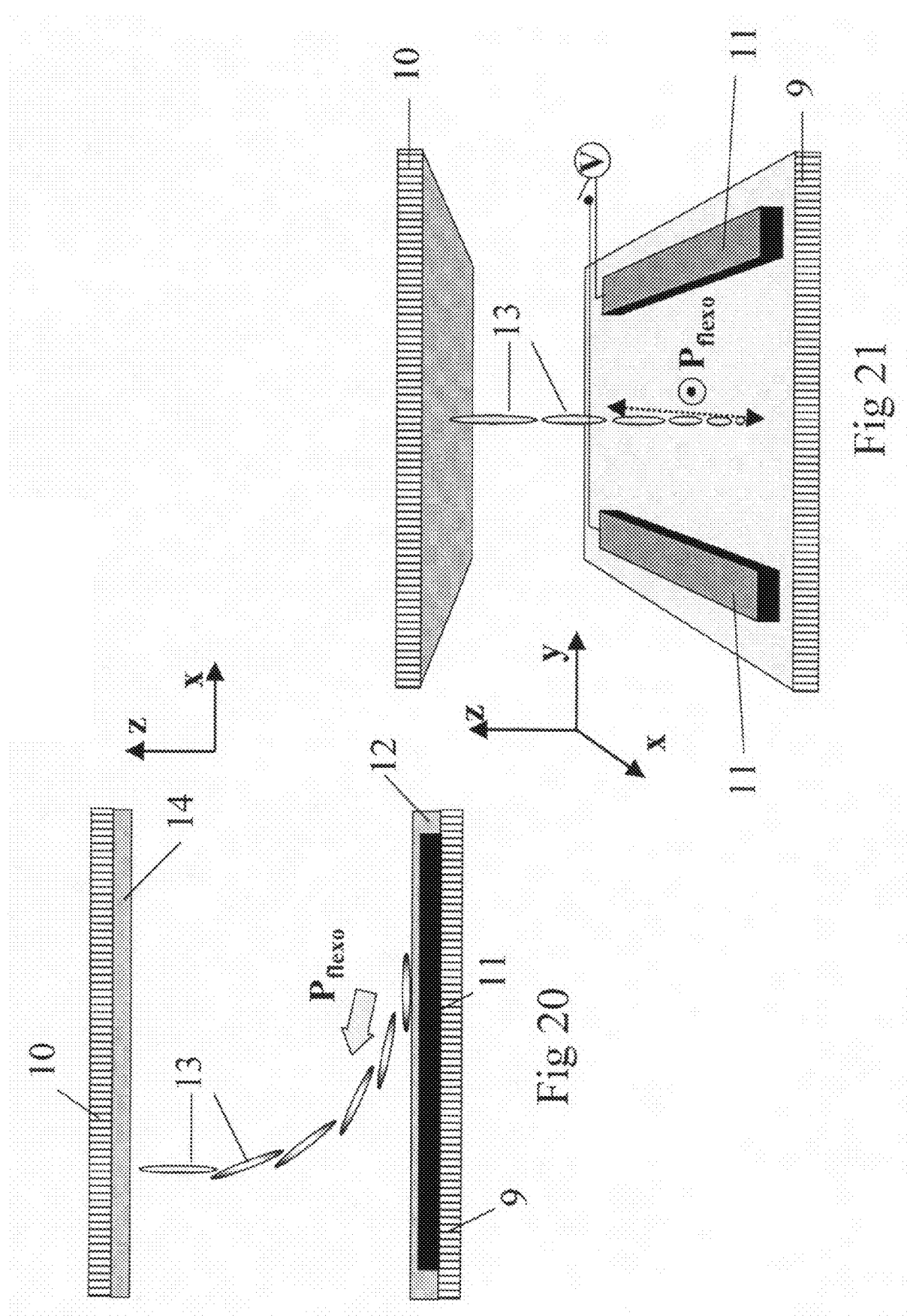

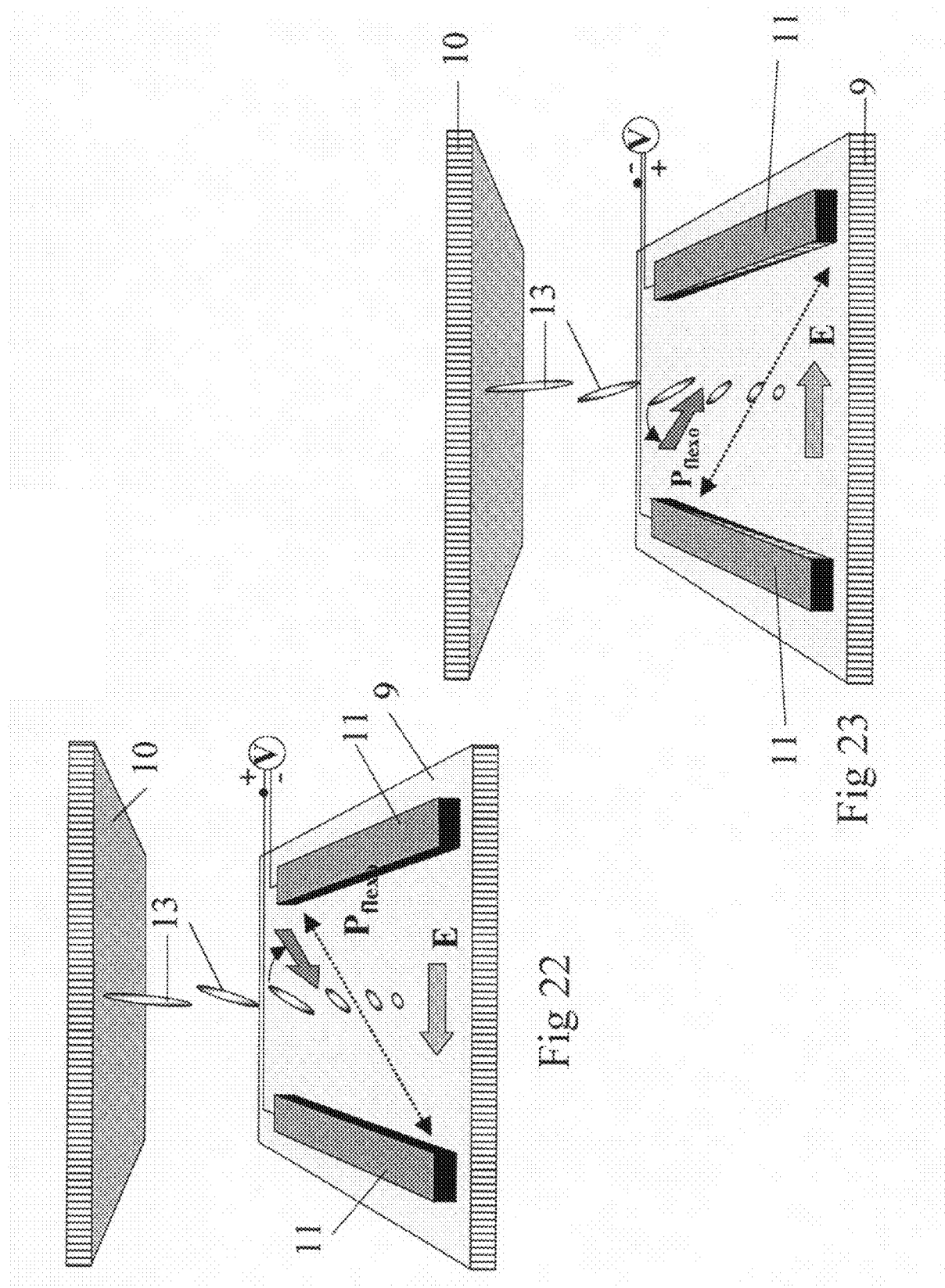

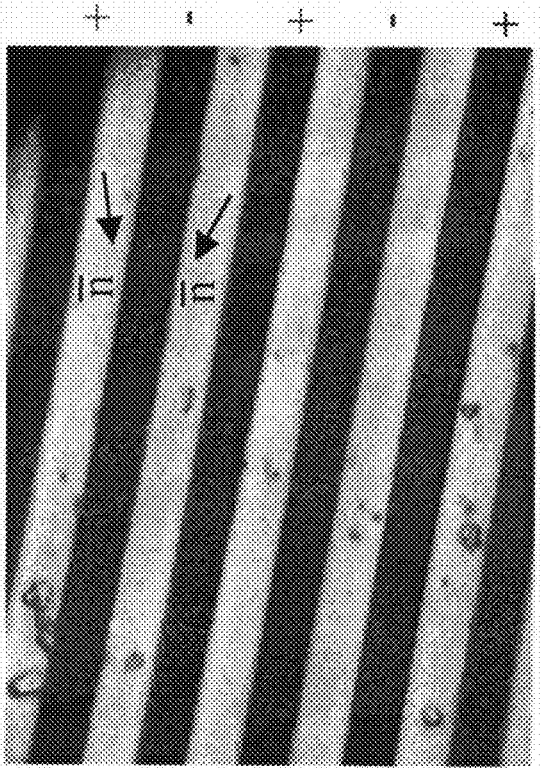
Fig 25
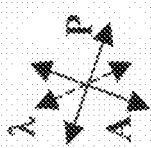
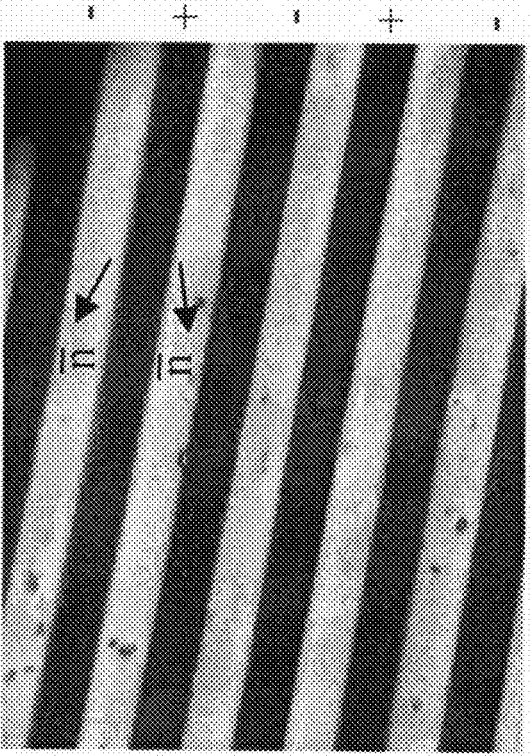
Fig 24

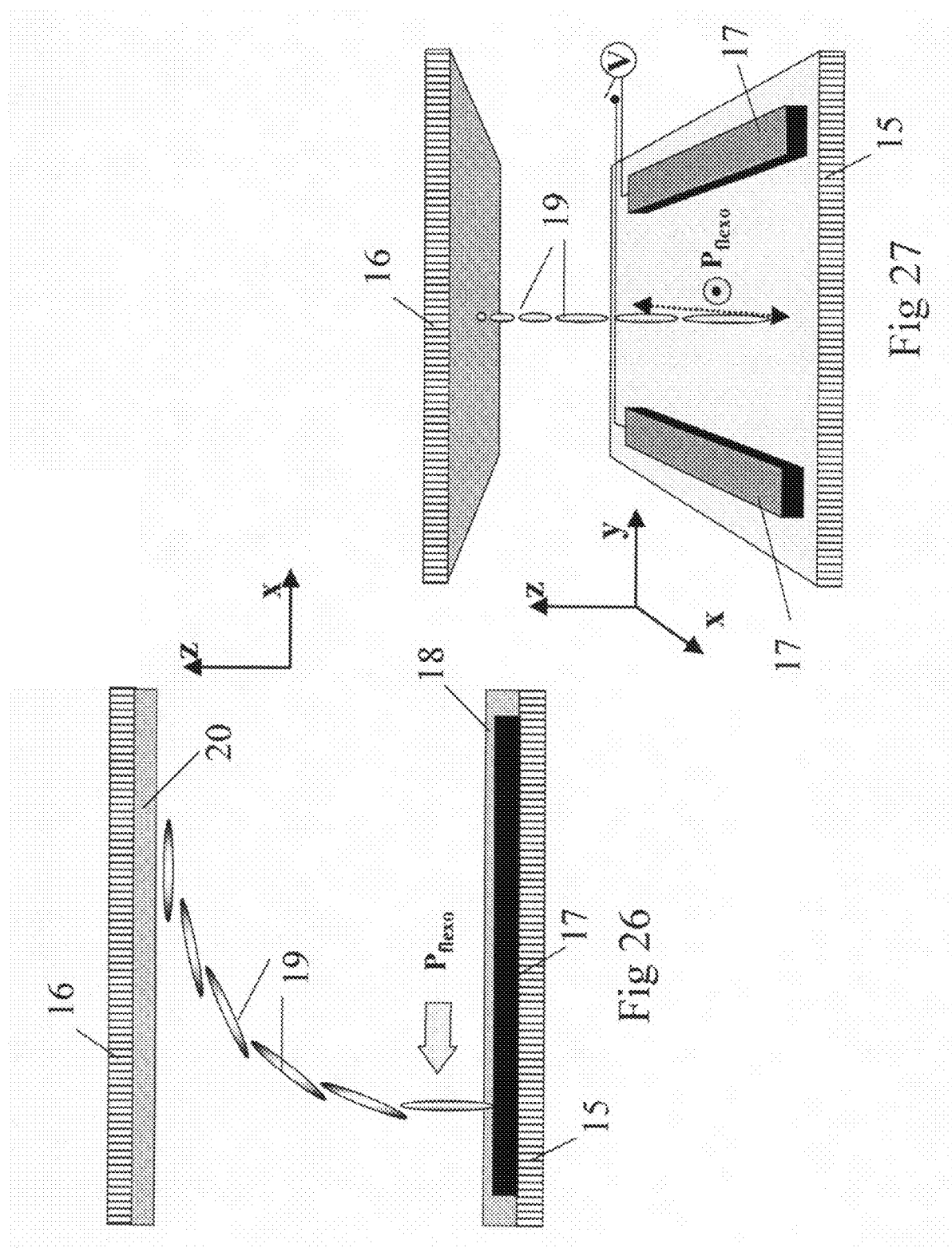

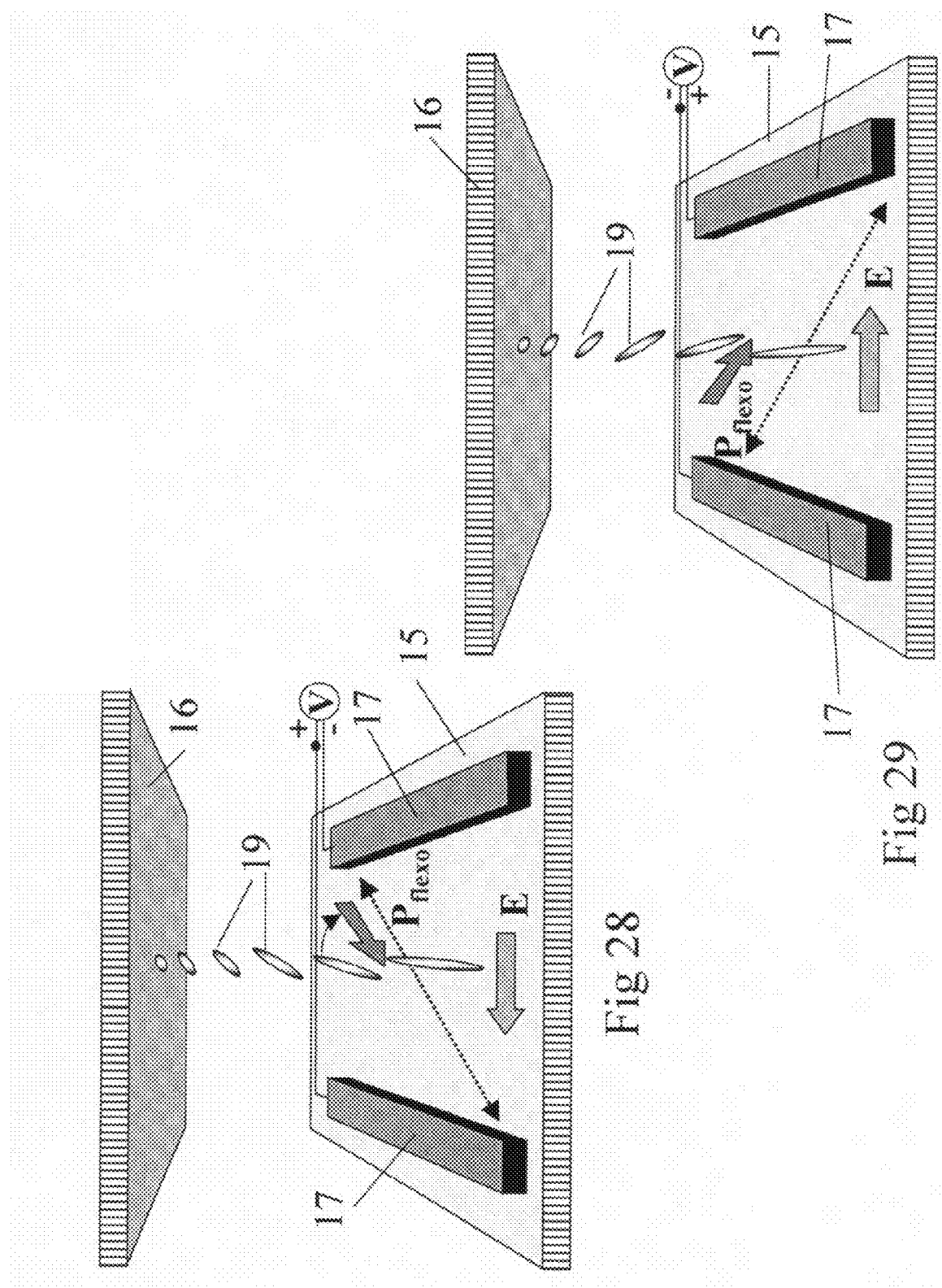

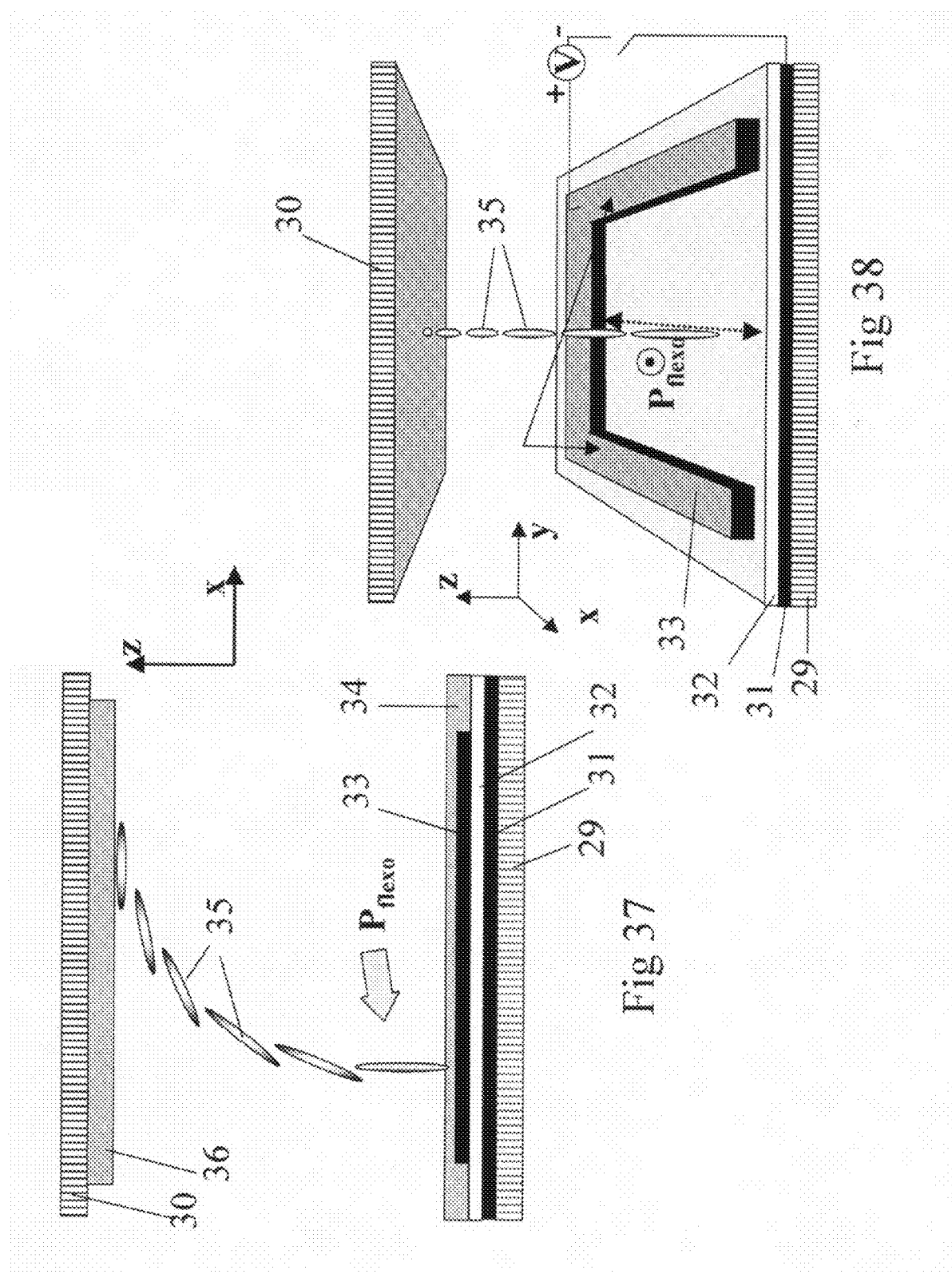

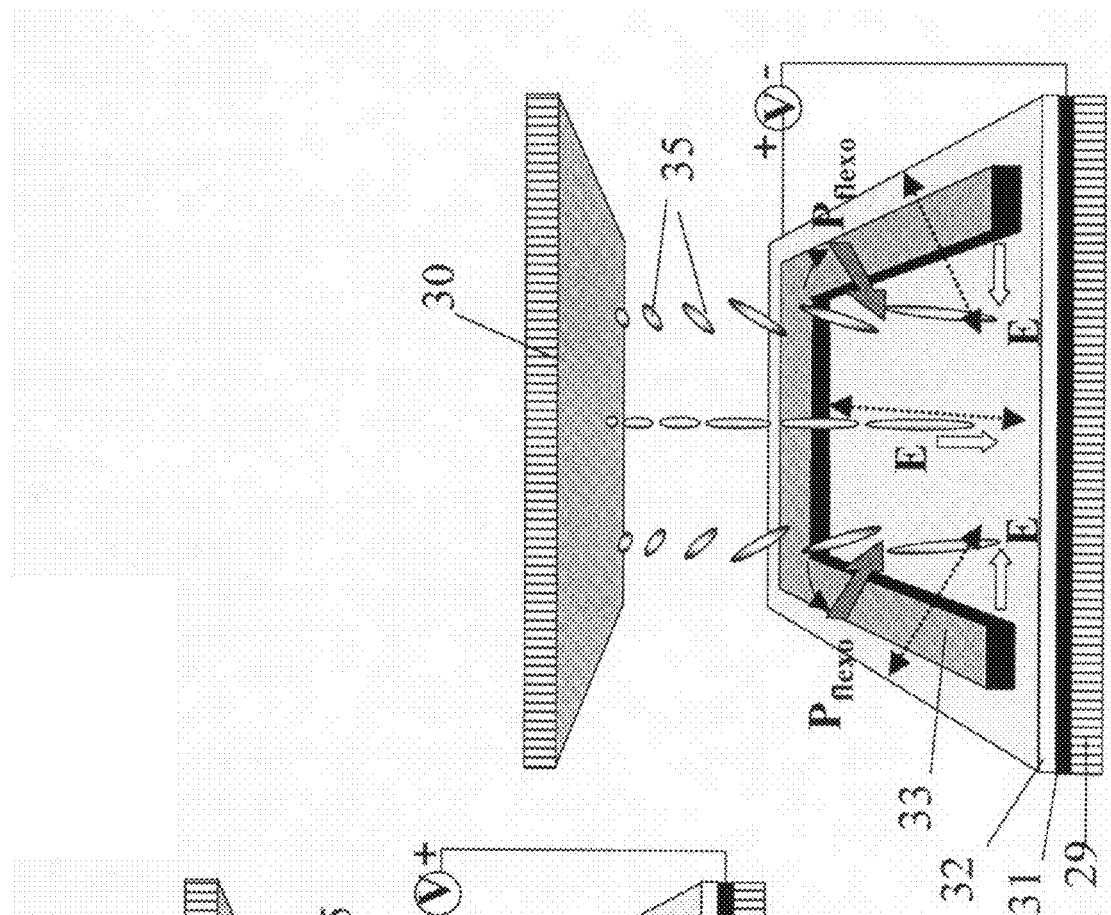
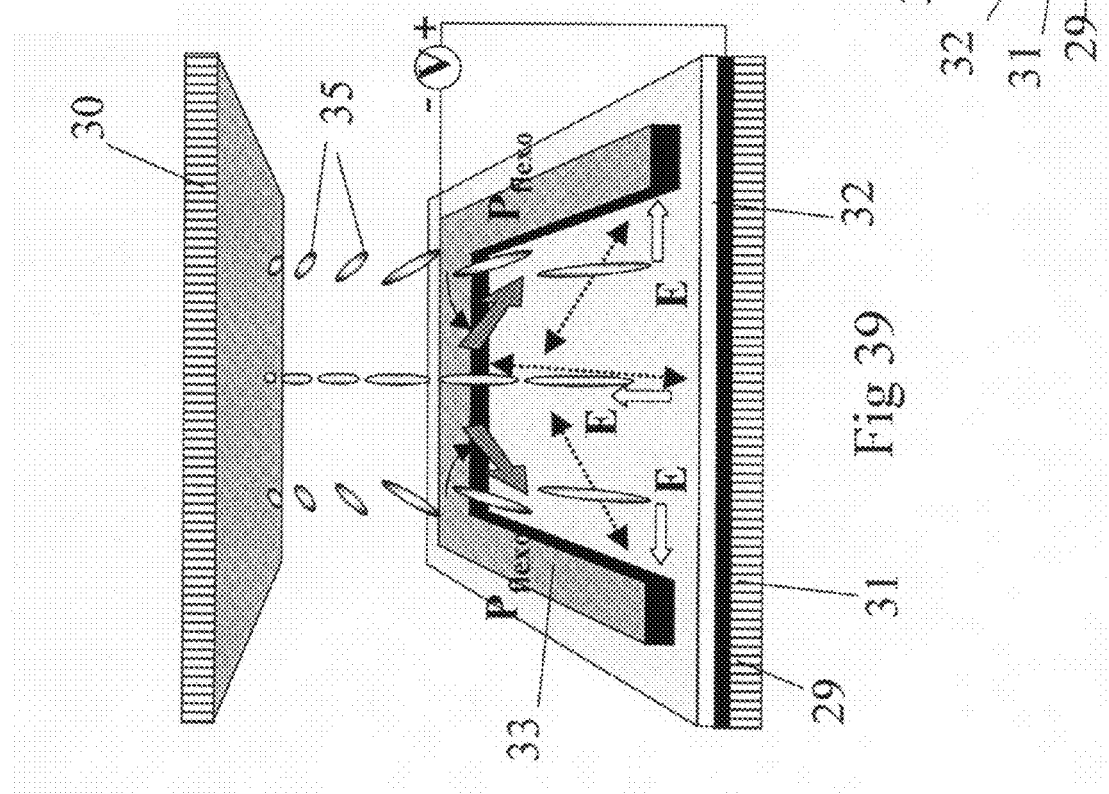

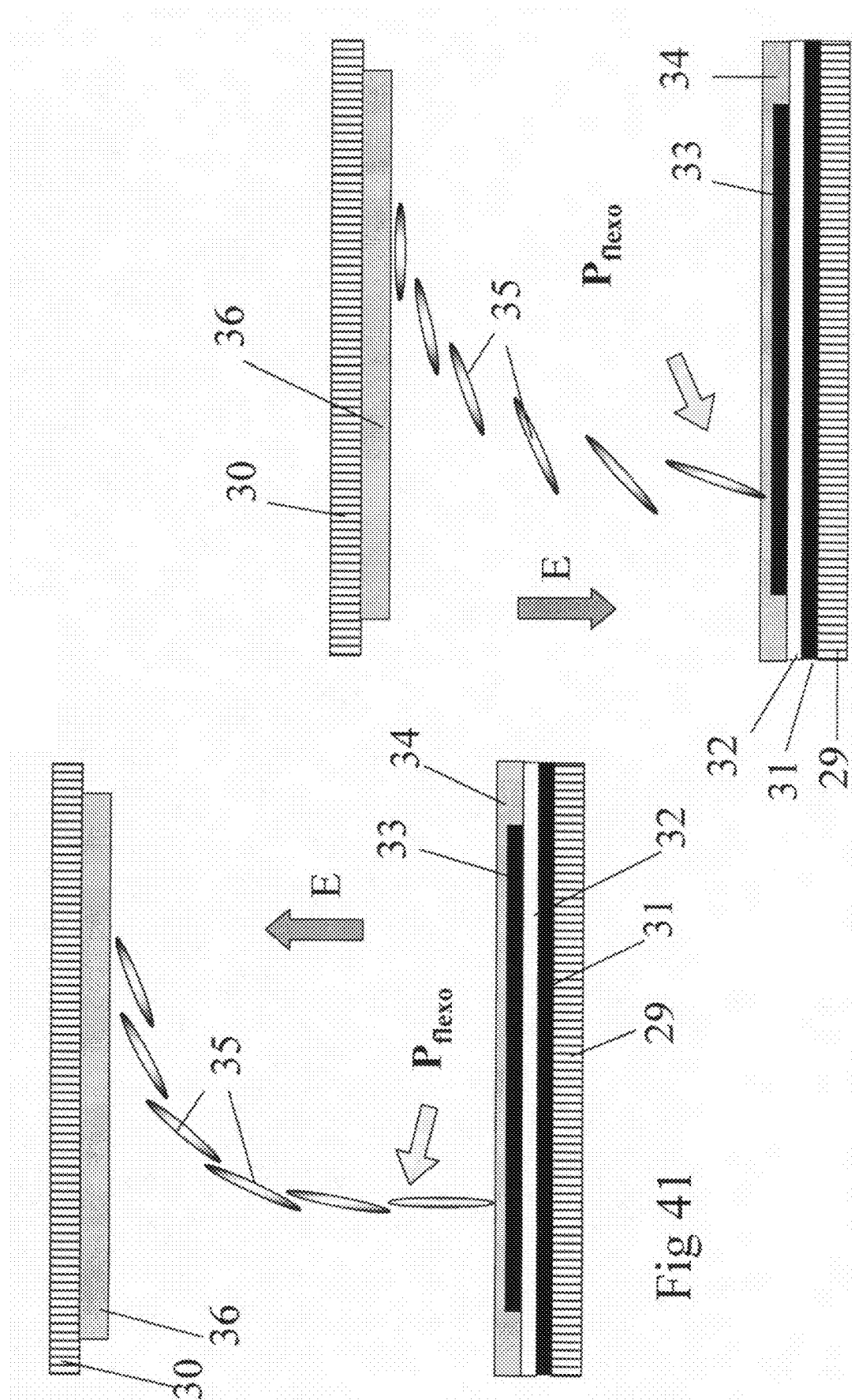

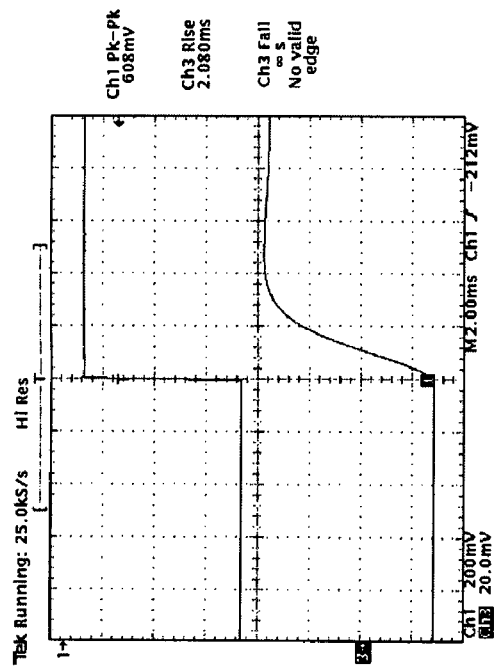
Fig 43
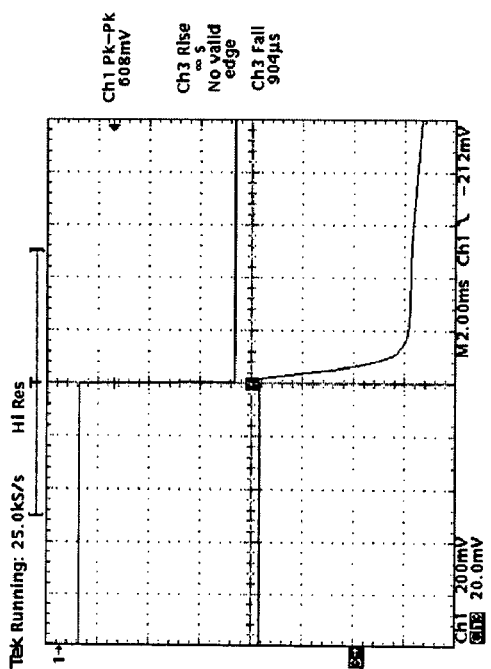
Fig 44
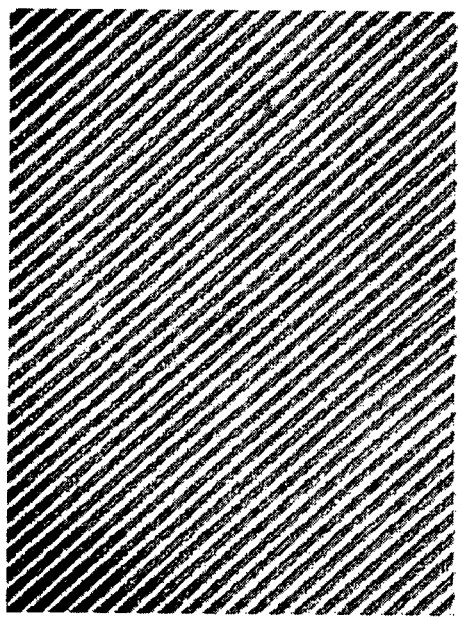
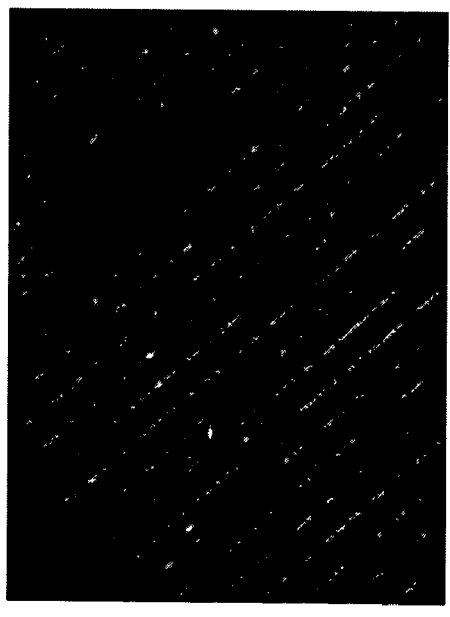

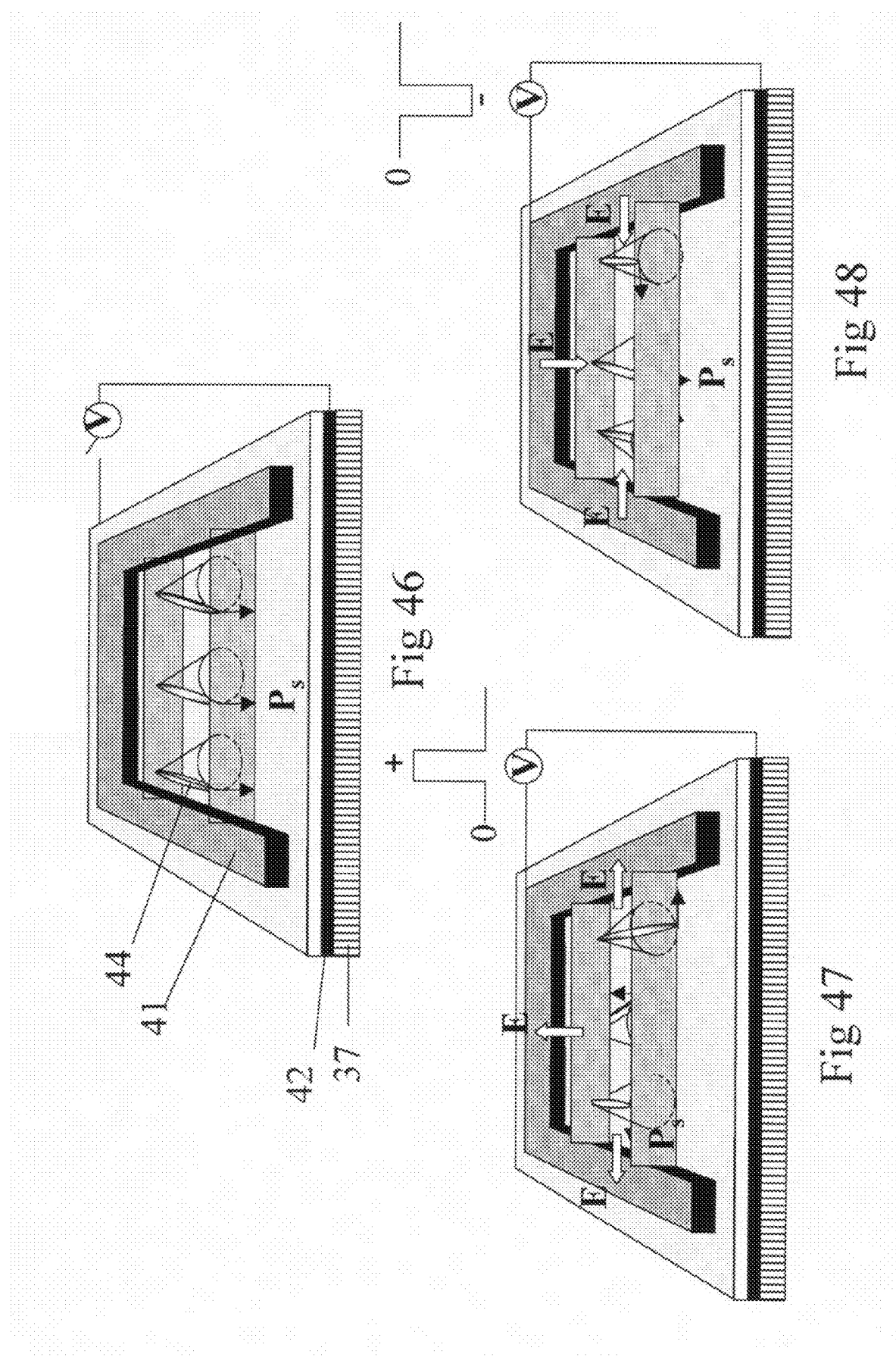

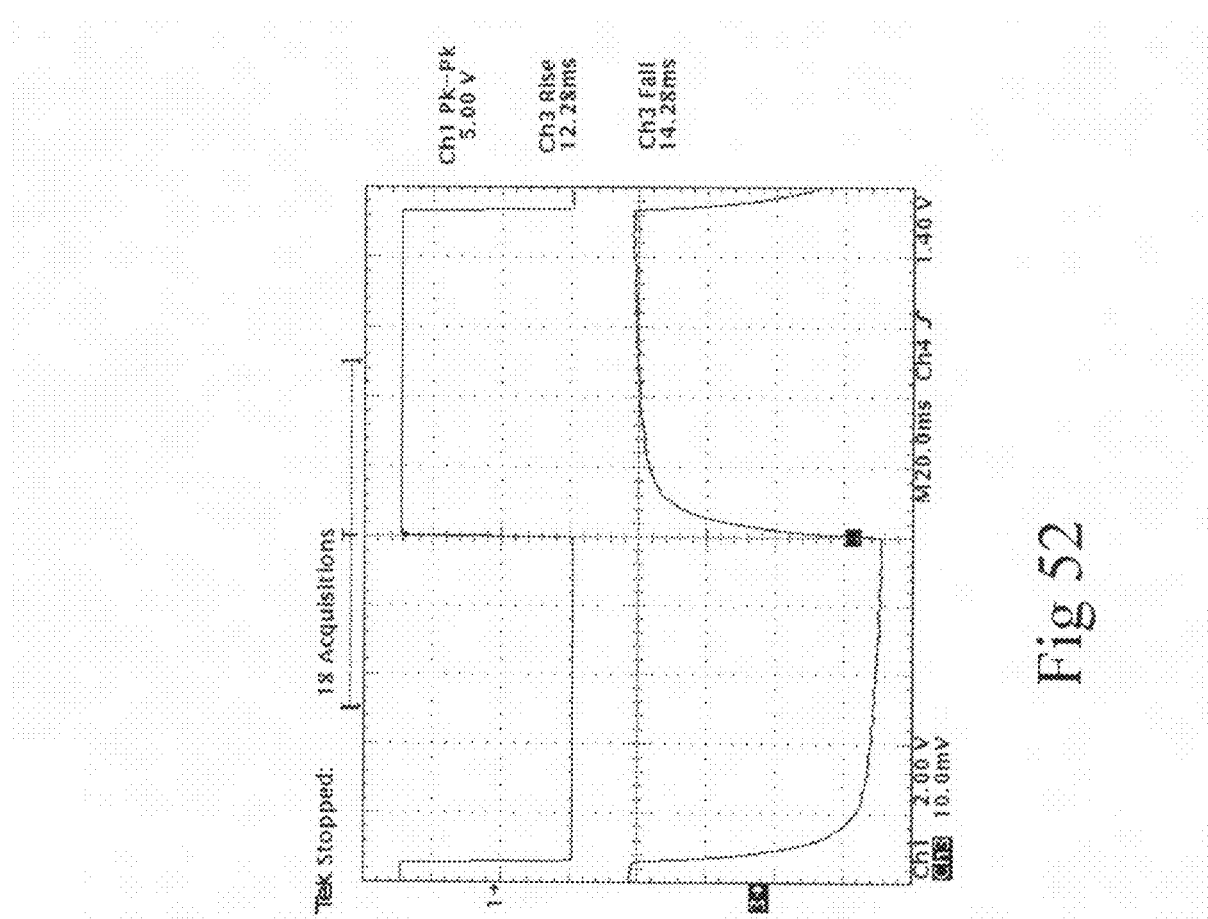
Fig 52
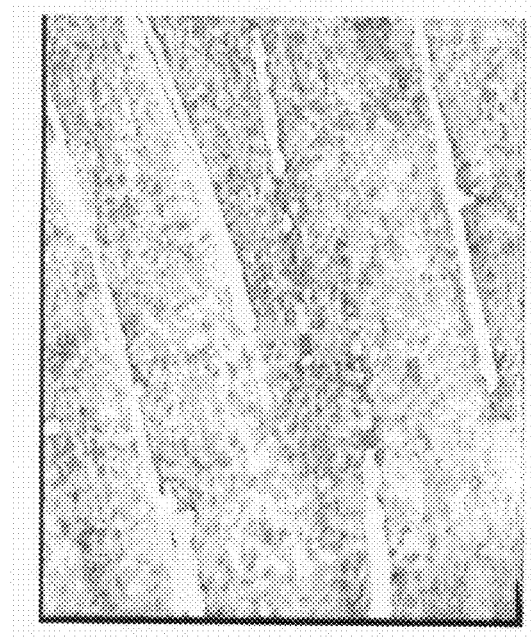
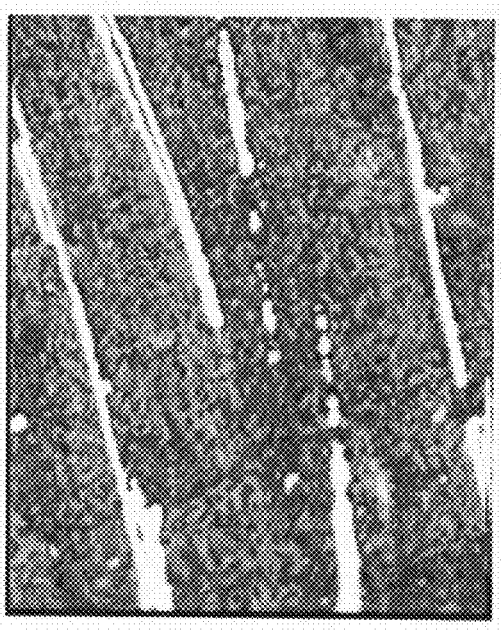

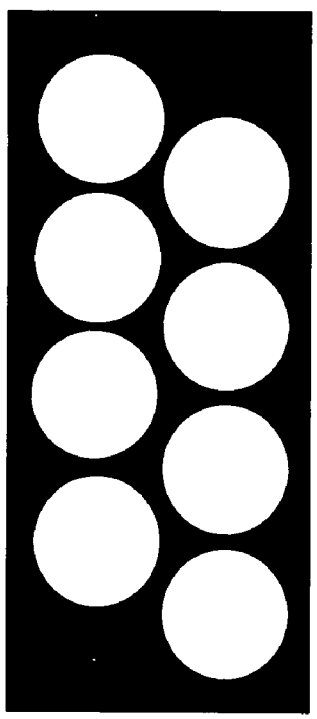
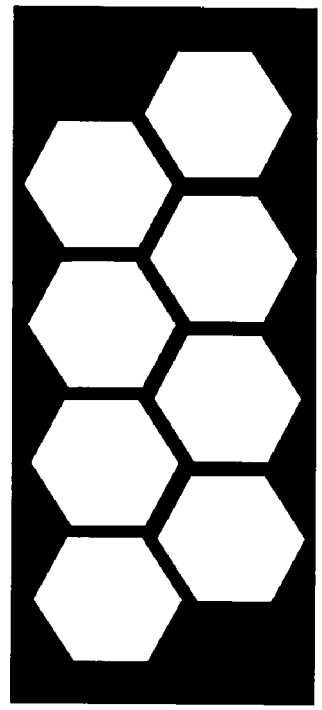
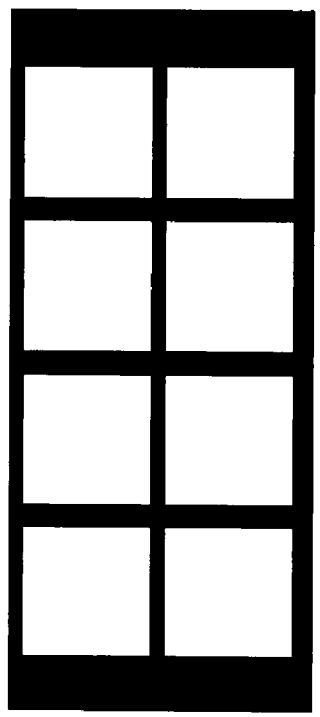
Fig 56

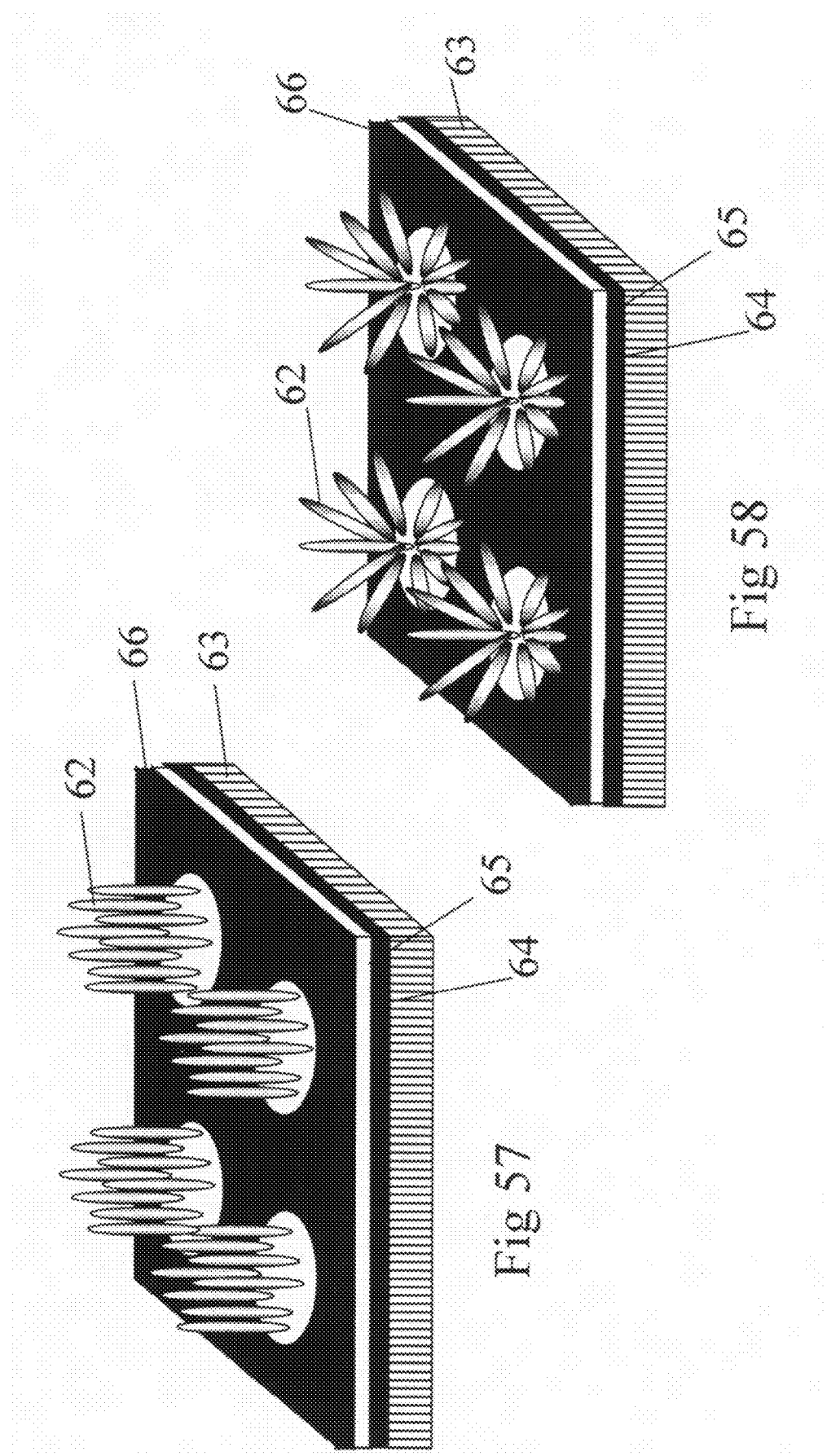

LIQUID CRYSTAL DEVICE

TECHNICAL FIELD

The present invention generally relates to the field of liquid crystals. More specifically, the present invention relates to a liquid crystal device driven by a linear coupling, such as ferroelectric and/or flexoelectric coupling, between liquid crystals in a polarized state and an applied in-plane electric field.

TECHNICAL BACKGROUND

In general, nematic liquid crystal displays (LCD) are operating on the basis of dielectric coupling, i.e. the coupling between dielectric anisotropy ($\Delta\epsilon$) of the liquid crystal and an applied electric field which gives rise to an electro-optic response. This response is quadratic with the applied field, i.e. it is not polar, and arises from the switching of the liquid crystal molecules by the field. In conventional nematic LCDs, the switching of the liquid crystal molecules takes place in a plane containing the direction of the applied electric field which means that an electric field applied across a liquid crystal sandwich cell will switch the molecules out-of-plane, i.e. in a plane perpendicular to the cell substrates. This kind of switching, however, gives an electro-optic response having a contrast strongly dependent on the viewing angle. Moreover, the total time of the response ($\tau$), i.e. the switching time, which is the sum of the rise ($\tau_r$) and the fall (field-off) ($\tau_f$) time, is usually not short enough for displaying moving images.

On the other hand, LCDs having an interdigitated electrode pattern (generating an in-plane electric field) deposited on the inner surface of one of the substrates, exhibit in-plane switching (IPS) of the optic axis and thus provide images whose contrast is less dependent on the viewing angle. In the improved version S-IPS (super in-plane switching) a herringbone electrode structure is utilised. Nonetheless, the switching time of the displays operating in IPS-mode is not short enough for generating high quality moving images.

In-plane electric fields could also effectively be generated by comb-like electrode structures generating a fringe electric field. However, also in these so-called fringe field switching (FFS) devices, dielectric coupling is generally utilised and the problem with the long field-off time mentioned above is thus not solved.

It should be mentioned that in the cases described above, the field-off time ($\tau_f$) does not depend on the magnitude of the applied electric field whereas the rise time ($\tau_r$) does. Hence, while the rise time could be efficiently controlled by the electric field, the field-off time is field-independent. It depends only on the cell characteristics, such as cell gap, as well as on the liquid crystal materials parameters, such as viscosity and anchoring strength to the solid substrates.

Another known method for switching a nematic liquid crystal between different optical states utilises the linear coupling between flexoelectric bulk polarization of an initially deformed nematic liquid crystal and an applied electric field ("Flexoelectrically controlled twist texture in a nematic liquid crystal", Dozov et al, J de Phys Lett, 43 (1982), L-365-L-369); and "A novel polar electrooptic effect in reversely pretilted nematic liquid crystal layers with weak anchoring", Komitov et al, Proceedings of 3$^{rd}$ International Display Research Conference, October 1983, Kobe, Japan).

WO 2005/071477 describes a liquid crystal device comprising a flexoelectric liquid crystal bulk layer, wherein an inhomogeneous electric field in a direction substantially parallel to the substrates is generated by an interdigitated electrode pattern. It is preferred that the average polarization direction in a direction parallel to the substrates in field-off state is orthogonal to the direction in which an electric field is to be generated. In this case, both the rise and the fall times become field-dependent and the total response time is thereby decreased.

A ferroelectric liquid crystal (FLC) display device including a comb-like electrode is also known (JP 10-161128).

In-plane switching of a nematic liquid crystal by an electric field applied across the cell substrates has been realized recently by using an electrically commanded surface (ECS). The published international patent application No. WO 00/03288 describes the so-called ECS principle.

According to the ECS principle, a separate thin chiral smectic liquid crystalline layer, preferably a ferroelectric (chiral smectic C phase, SmC*) liquid crystalline polymer layer, is deposited on the inner surface(s) of one or both of the substrates confining a liquid crystal bulk material in a conventional sandwich cell.

The chiral smectic liquid crystalline polymer layer acts as a surface-director alignment layer imposing a planar or substantially planar alignment on the adjacent liquid crystal bulk material. More specifically, when applying an external electric field across the cell—and thereby across the surface-director alignment layer—the molecules in the separate chiral smectic liquid crystalline layer will switch. The change of the dynamic surface-director alignment layer in response to the electric field is referred to as the "primary surface switching". This primary surface switching results in its turn, via elastic forces (steric coupling), in a switching of the preferred molecular orientation within the bulk volume of the liquid crystal bulk material confined between the substrates. This secondary switching is referred to as the "induced bulk switching". This induced bulk switching is an in-plane switching. Thus, the molecular switching in the dynamic surface-director alignment layer will be transmitted into the bulk volume via elastic forces at the boundary between the separate surface-director alignment layer and the bulk layer, thus resulting in a relatively fast in-plane switching of the bulk volume molecules mediated by the dynamic surface-director alignment layer.

The chiral smectic liquid crystalline layer, i.e. the dynamic surface-director alignment layer, may be a synclinic or anti-clinic chiral smectic, e.g. smectic C (SmC* or SmC$_A$*), material or a chiral smectic A (SmA*) material, including so-called random SmC*. Thus, the response of the dynamic surface-director alignment layer to an applied electric field may be ferroelectric, antiferroelectric or paraelectric, respectively.

The published international patent application No. WO 2003/081326 describes a liquid crystal device comprising a liquid crystal bulk layer and chiral dopants inhomogeneously distributed in the bulk layer as a result of being permanently attached to at least one surface, said dopants thereby inducing a spontaneous polarisation in a sub-volume of the bulk layer adjacent said surface. The response of the bulk layer within said sub-volume to an electrical field applied over the bulk layer may be ferroelectric, antiferroelectric, or paraelectric.

The use of an ECS layer/sub-volume in a liquid crystal device provides a fast in-plane switching and a comparatively high image contrast. However, it would be desirable to improve the contrast even further. Furthermore, the required voltages are rather high.

SUMMARY OF THE INVENTION

A general object of the present invention is to alleviate the above problems and provide an improved liquid crystal device. In particular, an object of the invention is to provide a liquid crystal device having the capability of generating high contrast and wide viewing angle images and exhibiting a fast in-plane switching, more particularly to shorten the fall time of the electro-optic response, and hence to reduce the total switching time enabling a satisfactory display of moving images.

Another object of the invention is to decrease the magnitude of the threshold voltage for mediating switching of the liquid crystal bulk, i.e. to decrease the driving voltage of the liquid crystal device. This is particularly important for portable applications, such as cellular phones.

The invention is not directed to displays only, but may be useful in many other liquid crystal devices as well.

According to a first aspect of the invention, there is provided a liquid crystal device comprising two confining substrates, a liquid crystal bulk layer arranged between said substrates, an electrode pattern applied on the inner surface of one of the substrates for generating an inhomogeneous electric field over a first sub-volume of the bulk layer adjacent to said electrode pattern, said electric field being inhomogeneous with regard to direction of field lines and strength thereof, an optional alignment layer arranged to interact with the bulk layer at a bulk surface thereof and applied on said electrode pattern, said electric field being generated also over said optional alignment layer, and liquid crystals in a polarized state comprised in said first sub-volume and/or in said optional alignment layer, said polarization being stronger than any possible similar liquid crystal polarization of the bulk layer outside said first sub-volume, said alignment layer and/or a second sub-volume of the bulk layer adjacent the inner surface of the other substrate, or an optional second alignment layer or an optional second electrode pattern applied thereon, and capable of coupling with said electric field to perform switching of said liquid crystals for accomplishing via elastic forces a switching of the liquid crystals of the bulk layer.

Other features and advantages of the present invention will become apparent from the following description of the invention.

BRIEF DESCRIPTION OF DRAWINGS

FIG. 1 is schematic view of an interdigitated electrode pattern for implementation in a device according the invention.

FIG. 2 is a schematic cross-section of the in-plane electric field generated by the interdigitated electrode pattern shown in FIG. 1.

FIGS. 4-14, 16 and 17 are schematic cross-sections illustrating how flexoelectric polarization can be induced at one of the substrate surfaces by the surface topography and/or anchoring properties of the alignment layer in a device according to the invention.

FIGS. 20-25 illustrate the structure and performance of a device according to the invention comprising a nematic bulk layer with hybrid alignment (HAN) and interdigitated electrodes.

FIGS. 26-31 illustrate the structure and performance of a device according to the invention comprising a nematic bulk layer with a reversed hybrid alignment (HAN) and interdigitated electrodes.

FIGS. 37-44 illustrate the structure and performance of a device according to the invention comprising a nematic bulk layer with a reversed hybrid alignment (HAN) and an electrode pattern generating a fringe field.

FIGS. 45-50 and 53-55 illustrate the structure and performance of a device according to the invention comprising a ferroelectric alignment layer and an electrode pattern generating a fringe field.

FIGS. 51 and 52 illustrate the structure and performance of a device comprising a ferroelectric alignment layer and an electrode structure generating an electric field over the entire bulk.

FIGS. 56-59 show examples of top electrode structures for use in an electrode pattern generating a fringe field in a device according the invention.

DETAILED DESCRIPTION OF THE INVENTION

Figure 3:
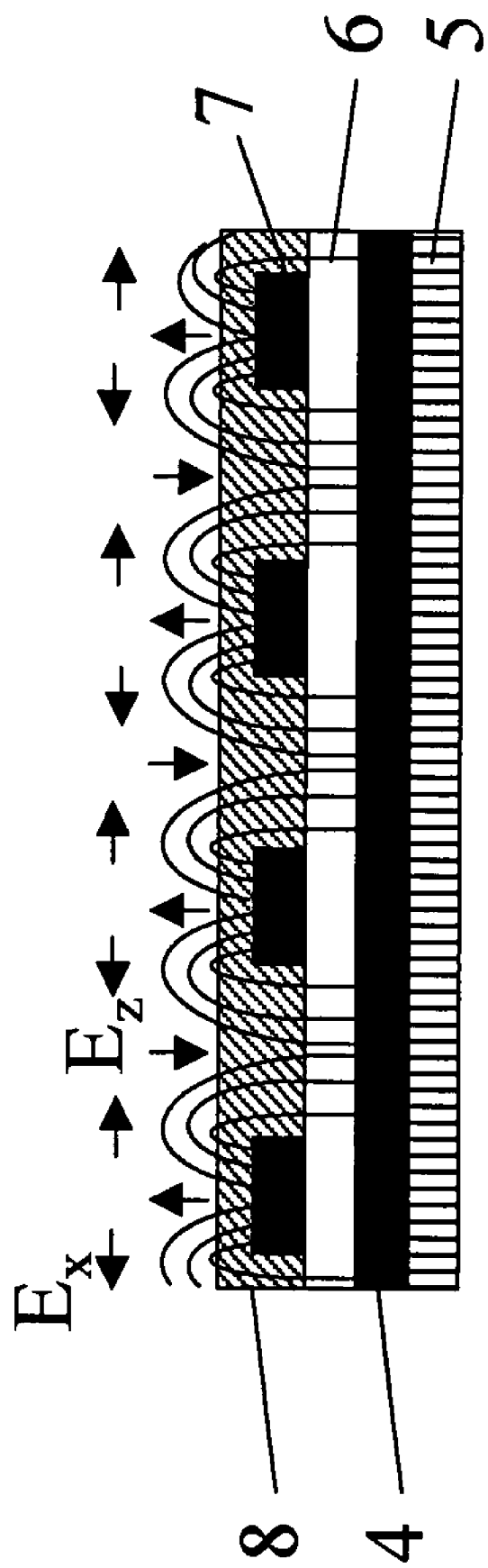
FIG. 3 is a schematic cross-section of an electrode structure comprising a comb-like electrode for generating a fringe field in a device according the invention.

The invention relates to a liquid crystal device comprising:
two confining substrates, such as glass or plastic substrates,
a liquid crystal bulk layer arranged between said substrates,
an electrode pattern applied on the inner surface of one of the substrates for generating an inhomogeneous electric field over a first sub-volume of the bulk layer adjacent to said electrode pattern, said electric field being inhomogeneous with regard to direction of field lines and strength thereof,
an optional alignment layer arranged to interact with the bulk layer at a bulk surface thereof and applied on said electrode pattern, said electric field being generated also over said optional alignment layer, and
liquid crystals in a polarized state comprised in said first sub-volume and/or in said optional alignment layer, wherein said polarization is stronger than any possible similar liquid crystal polarization of the bulk layer outside said first sub-volume, said alignment layer and/or a second sub-volume of the bulk layer adjacent the inner surface of the other substrate, or an optional second alignment layer or an optional second electrode pattern applied thereon, and capable of coupling with said electric field to perform switching of said liquid crystals for accomplishing via elastic forces a switching of the liquid crystals of the bulk layer.

It may be noted that in the case where the above device comprises said (first) alignment layer applied on the (first) electrode pattern, said first sub-volume is adjacent said (first) alignment layer.

It is advantageous that the polarization of said sub-volume and/or optional alignment exist in the absence of an electric field (i.e. at field-free condition).

As used herein the term "similar polarization", when comparing the strength of the polarization in the sub-volume and/or optional alignment layer and the strength of the polarization in the bulk layer outside said first and second sub-volumes and optional alignment layer, refers to polarization providing the same kind of electric coupling, i.e. ferroelectric or flexoelectric coupling.

In the case when said liquid crystals in polarized state are comprised in said optional alignment layer, the alignment layer can be referred to as a dynamic alignment layer since it then will couple with said applied electric field to perform switching of said liquid crystals. The device according to the invention can in addition or alternatively comprise passive alignment layer(s) applied on one or both of the substrate surfaces.

Since the electric field is generated by an electrode pattern comprising electrodes applied on the same substrate surface, the field is substantially localised near the substrate surface bearing the electrode pattern. Thus, the electric field vanishes exponentially in the liquid crystalline bulk layer. Moreover, the field comprises electric field lines in directions substantially parallel to the substrate surface, i.e. an in-plane electric field is generated.

Said electric field is advantageously generated by an electrode pattern comprising either interdigitated electrodes or fringe-field generating electrodes, such as an electrode pattern comprising a comb-like electrode structure.

An electrode pattern comprising interdigitated electrodes 1 and 2, applied on the inner surface of one of the substrates 3, is shown in FIG. 1. As shown in FIG. 2, the electric field (E) generated by interdigitated electrodes 1 and 2 is localized substantially at the substrate surface 3 bearing the electrodes 1 and 2. The field (E) mainly comprises electric field lines in directions substantially parallel to the substrate surface 3 on which the electrodes 1 and 2 are applied. However, the electric field (E) also comprises some electric field lines in directions non-parallel, including substantially vertical, to the substrate surface 3 on which the electrodes 1 and 2 are applied. The direction of the field lines alternate when passing from one electrode gap to the next one. Thus, the electric field is inhomogeneous with regard to the direction of the field lines (and the strength thereof).

As understood by a person skilled in the art, an electrode pattern comprising interdigitated electrodes can have many other configurations besides the one shown in FIG. 1. The common feature for all electrode patterns comprising interdigitated electrodes is that the electrodes are arranged in the same geometrical plane.

An electrode pattern comprising a comb-like electrode structure is shown in FIG. 3. The electrode pattern comprises a first conductive layer 4 (also called common electrode or bottom electrode), e.g. a layer of indium tin oxide (ITO), arranged on a substrate surface 5, an isolation layer 6, usually $SiO_x$, arranged on said first conductive layer and a second conductive layer (also called top electrode) 7, e.g. a layer of indium tin oxide, arranged on top of said insulation layer, said second conductive layer 7 having a comb-like form. An optional alignment layer 8 is also shown in FIG. 3. The electric field (fringe field) generated by this electrode structure is substantially localized near the substrate surface 5 bearing the electrodes 4 and 7. The field (E) comprises both electric field lines (in directions essentially parallel ($E_x$) and vertical ($E_z$) to the substrate surface 5 on which the electrodes 4 and 7 are applied (i.e. the fringe field comprises field components along the substrate surface 5 and perpendicular to it). The distribution of the field lines and their strength are dependent on the geometry of the electrodes 4 and 7 and their mutual positions.

Another type of fringe-field generating electrode pattern comprises a first conductive layer (bottom electrode) arranged on a substrate surface, an isolation layer arranged on said first conductive layer, and a second conductive layer (top electrode) having openings arranged on top of said insulation layer. Said second conductive layer can have a structure as shown in FIG. 56 or the like. FIG. 56*a* shows a top electrode structure with openings in the form of hexagons. FIG. 56*b* shows a top electrode structure with openings in the form of circular spots, and FIG. 56*c* shows a top electrode structure with openings in the form of squares. As understood by a person skilled in the art, said top electrode can take many other forms than those shown in FIG. 56. This type of electrode pattern is advantageous for displaying wide viewing angle images.

FIG. 57 and FIG. 58 show the orientation of liquid crystal bulk molecules 62 in a field-on and field-off state, respectively, at one substrate surface 63 of a liquid crystal device comprising an alignment layer (not shown) promoting a hometropic alignment, a nematic liquid crystal bulk layer 62 exhibiting a positive dielectric anisotropy and a fringe-field generating electrode pattern comprising a bottom electrode 64 arranged on said substrate surface 63, an isolation layer 65 arranged on said bottom electrode, and a top electrode 66 with openings in the form of circular spots.

Figure 59:
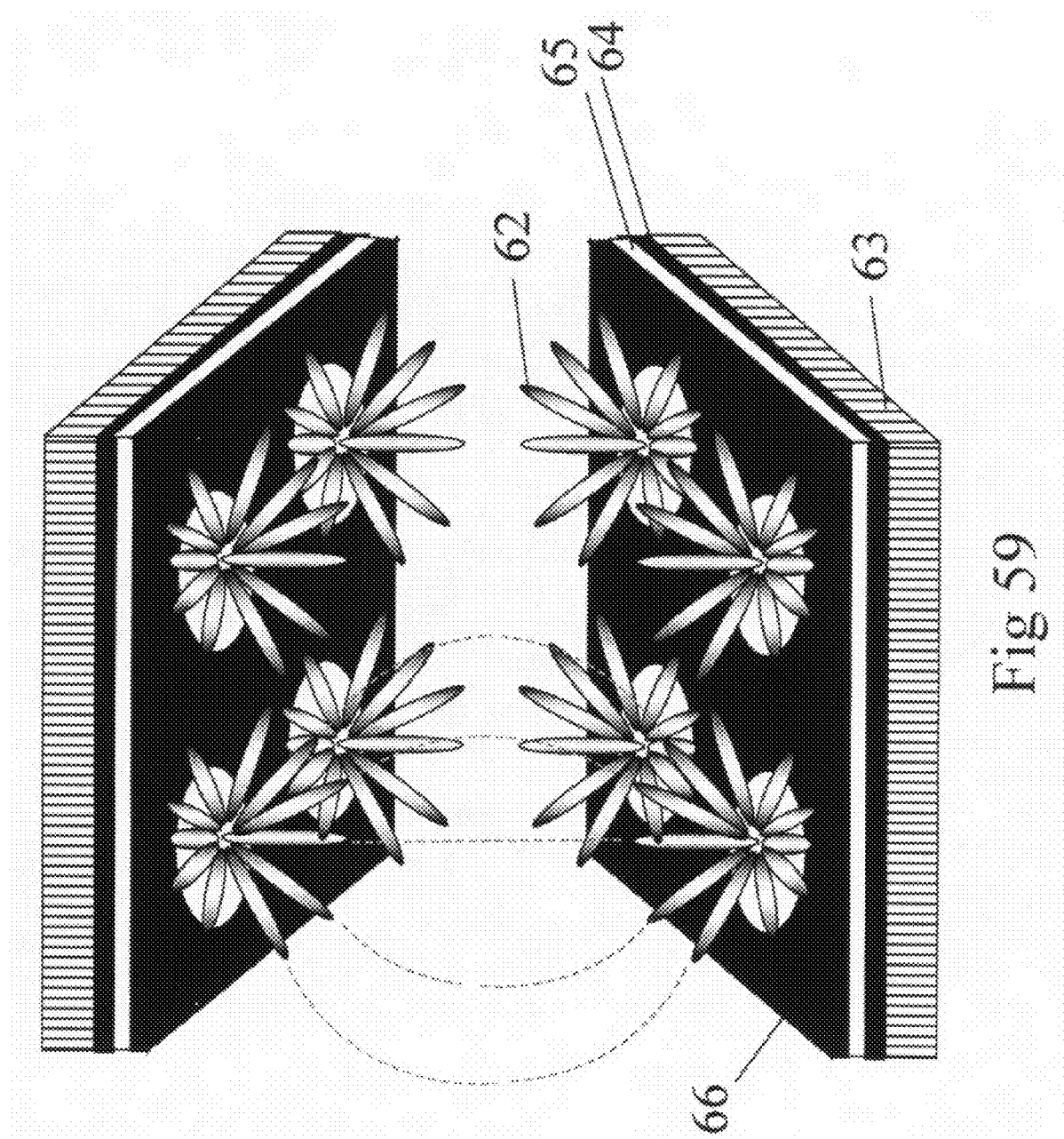

FIG. 59 illustrates the orientation of liquid crystal bulk molecules in the field-on state in a double-sided device.

It shall be noted that the device according to the invention can be either single-sided or double-sided.

In a single-sided embodiment of the device according to the invention, only one of the substrates comprises an electrode pattern applied on the inner surface thereof.

In a double-sided embodiment of the device according to the invention, both substrates comprise an electrode pattern applied on each of the inner surfaces thereof. Thus, in such a device a second electrode pattern is applied on the inner surface of the other substrate for generating an inhomogeneous electric field also over the second sub-volume of the bulk layer adjacent to said second electrode pattern, or an optional second alignment layer applied thereon, said electric field being inhomogeneous with regard to direction of field lines and strength thereof.

In a device according to the invention comprising the same type of interdigitated electrodes applied on both substrates (double-sided embodiment), it is particularly advantageous that the orientation along the first substrate surface of the electrodes applied thereon is angled with respect to the orientation along the second substrate surface of the electrodes applied thereon. This type of arrangement substantially increases the viewing angle of the device.

In a device according to the invention comprising the type of interdigitated electrodes as shown in FIG. 1 applied on both substrates, it is particularly advantageous that the electrodes on the first substrate surface is arranged along the substrate surface in a direction essentially perpendicular with respect to the direction of the electrodes arranged along the second substrate surface.

Furthermore, in a double-sided embodiment of the device according to the invention it might be advantageous that each sub-volume (first and second sub-volume, respectively) adjacent said electrode patterns and/or each optional alignment layer applied on said electrode patterns comprises liquid crystals in a polarized state exhibiting ferroelectric or flexoelectric coupling with an applied electric field. In this case, the polarization in each of said sub-volume(s) and/or alignment layer(s) is stronger than any possible similar liquid crystal polarization of the bulk layer outside said sub-volume(s) and/or alignment layer(s). However, it shall be noted that the polarisation strength in each sub-volume and/or alignment layer can differ in comparison to each other.

More specifically, said liquid crystals in polarized state comprised in the sub-volume and/or in said optional alignment layer exhibit either a spontaneous polarisation or an induced polarisation, including induced spontaneous polarisation.

In particular, the coupling between said polarisation in the sub-volume and/or in said optional alignment layer and said applied electric field is either ferroelectric, antiferroelectric, paraelectric or flexoelectric.

In a first group of embodiments of the invention, said alignment layer comprises a chiral smectic (Sm*), such as SmC*, $SmC_A$*, or SmA*, liquid crystalline material A smectic liquid crystalline structure comprises liquid crystal molecules arranged in adjacent smectic layers. Smectic A and smectic C phases are the two most important representatives of these "layered" liquid crystals. Furthermore, smectic liquid crystal molecules can be achiral (e.g. SmA, SmC or $SmC_A$) or chiral (e.g. SmA*, SmC* or $SmC_A$*), where the term chiral means lack of mirror symmetry.

A tilted chiral smectic liquid crystal possesses a director that rotates in a cone in going from one smectic layer to the next. The apex angle $\theta=2\beta$ of the cone may typically be in the order of 45°. Thereby, a helix texture is formed across the layers with the helix axis being perpendicular to the smectic layers and parallel to the axis of said cone. However, the local spontaneous polarisation ($P_s$) which is coupled to the director will then also turn around in a helical fashion, with the same period or pitch. Such a helical structure of the local polarisation means that the local polarisation is self-cancelling, i.e. a bulk liquid crystal will present no macroscopic polarisation.

In a smectic A phase structure, the average direction of the molecules is perpendicular ($\beta=0°$) to the smectic layer normal, i.e. the molecules are directed along the smectic layer normal. If an electric field is applied to a chiral smectic A (SmA*) liquid crystalline structure, the response to the applied field will be a so-called paraelectric response.

In a smectic C phase structure, the molecules are inclined with an angle $\beta$ (typically in the order of 22.5°) with respect to the smectic layer normal.

In a synclinic smectic, e.g. smectic C, liquid crystalline structure, the molecules of two adjacent smectic layers are tilted in the same direction with respect to the smectic layer normal. If an electric field is applied to a synclinic chiral smectic, e.g. smectic C* (SmC*), liquid crystalline structure, the response to the applied field will be a so-called ferroelectric response.

In an anticlinic smectic, e.g. smectic CA, liquid crystalline structure, the molecules of two adjacent smectic layers are tilted in the opposite direction with respect to the smectic layer normal. If an electric field is applied to an anticlinic chiral smectic, e.g. smectic CA ($SmC_A$*), liquid crystalline structure, a so-called antiferroelectric response will be given. However, if the applied electric field is above a certain threshold, the anticlinic structure will be transformed to synclinic structure, i.e. a ferroelectric response to the applied electric field will be provided.

Thus, in this first group of embodiments of the device according to the invention, coupling between said polarisation in the alignment layer and the applied electric field can be ferroelectric, antiferroelectric or paraelectric, more advantageously ferroelectric. As explained in the introduction, the primary switching of the molecules in this chiral smectic alignment layer results via elastic forces (steric coupling) in an induced switching of the molecular orientation of the liquid crystals in the bulk layer.

It is advantageous that the chiral smectic alignment layer in this group of embodiments of the device according to the invention comprises a synclinic chiral smectic, e.g. smectic C (SmC*), liquid crystalline material, in particular a synclinic chiral smectic C (SmC*) liquid crystalline polymer, also referred to as ferroelectric liquid crystalline polymer (FLCP).

The chiral smectic liquid crystalline material, such as FLCP, of the alignment layer is advantageously insoluble in the liquid crystalline material of the bulk layer.

In particular, the liquid crystalline material of the alignment layer should not affect the physical properties of the liquid crystalline material of the bulk layer, and vice versa.

In this first group of embodiments, it is advantageous that the bulk layer comprises a chiral or achiral nematic or smectic liquid crystalline material, more advantageously a nematic or smectic liquid crystalline material possessing zero or a very small positive or negative dielectric anisotropy, i.e. $\Delta\epsilon\approx0$. Thus, the liquid crystalline material then exhibits essentially no dielectric coupling with an applied electric field.

In the case where the bulk layer comprises an achiral smectic liquid crystalline material, it is suitable that the smectic layers of the bulk layer are substantially parallel to the smectic layers of the alignment layer.

Furthermore, it is advantageous that the smectic layers of the alignment layer are oriented essentially parallel to the applied electric field.

The above disclosed alignment layer of this first group of embodiments of the invention can be referred to as a dynamic alignment layer since it is affected by and couples to an applied electric field.

The device according to this first group of embodiments of the invention may in addition comprise a passive alignment layer underlying said dynamic alignment layer thereby providing a preferred alignment direction to said dynamic alignment layer.

As explained in Examples 3 and 4, a flexoelectric bulk polarisation is induced in a device according to the invention with an alignment layer comprising a chiral smectic liquid crystalline material, such as a FLCP.

Furthermore, for this group of embodiments it has been found advantageous that the liquid crystal bulk molecules adjacent the substrate surface bearing the electrode pattern with said alignment layer applied thereon exhibits a higher molecular pretilt than the liquid crystal bulk molecules adjacent the opposite substrate surface.

Reference is made to WO 00/03288 for further information on how to produce the above-disclosed alignment layer exhibiting a spontaneous polarisation.

In a second group of embodiments of the invention, chiral dopants are inhomogeneously distributed in the bulk layer as a result of being permanently attached to at least one surface in said first sub-volume and thereby inducing a local increase of one or more chirality-related physical properties (herein also referred to as effect(s) of chirality) within said first sub-volume causing the appearance of a spontaneous polarisation having a non-homogenous distribution being maximum at said surface and dropping in a direction away from said surface, said chiral dopants being soluble in the liquid crystal bulk layer.

As used herein the term "soluble" means that the dopants are able to dissolve in the liquid crystal bulk layer.

Said induced increase of an effect of chirality does not take place in the whole volume of the bulk layer, but only in a restricted region (sub-region) thereof.

In this second group of embodiments, the bulk layer may comprise an achiral or chiral nematic or smectic liquid crystalline material, advantageously an achiral smectic, such as SmC, liquid crystalline material, and more advantageously an achiral smectic, such as SmC, liquid crystalline material possessing zero or a very small positive or negative dielectric anisotropy, i.e. $\Delta\varepsilon\approx0$.

As an illustrative example of this group of embodiments, the bulk layer may comprise an achiral smectic C liquid crystal material. In the sub-region, the achiral smectic C is doped by chiral dopants being soluble in the achiral smectic C and permanently attached to a surface in said sub-volume. The dopants induce chirality, and thus an increase of effect(s) of chirality, in the liquid crystal bulk material within the sub-volume. The induced chirality, in its turn, give rise to a spontaneous polarisation within the sub-volume providing ferroelectric properties. The actual volume of the sub-region being doped and the sub-volume presenting chirality and a spontaneous polarisation may differ slightly, since the dopant molecules will induce chirality also at a certain distance from the dopants. By applying said electrical field over the sub-volume exhibiting said induced spontaneous polarisation, the molecules will be switched very fast due to the direct ferroelectric coupling to the applied electrical field. This fast ferroelectric switching will in its turn result in a fast switching of the bulk molecules outside the sub-volume, because of the elastic coupling between the molecules in the surface sub-region and the adjacent molecules of the bulk volume.

The chiral dopants are permanently attached to a surface, which should be interpreted as the dopants are bonded to the surface in such a way that they are pre-vented from freely moving out in the bulk volume. Although the dopants are permanently attached to the surface, they may still present a limited movability, especially a movability that allows the dopant molecules to reorientate at the surface, e.g. during switching by an applied external electrical field.

The surface to which the dopants are attached, should be held to comprise not only a surface located at or defining the boundary of the bulk layer, but also a surface or a plane located inside the sub-volume. Thus, in this context, the term "surface" may comprise any physical or geometrical surface or plane having contact with the bulk layer material in said sub-volume, directly or indirectly via the dopant material.

The dopants are advantageously attached to the inner surface of said electrode pattern or said optional alignment layer arranged to interact with and thus provide a preferred molecular orientation of the liquid crystals of the bulk layer.

In this second group of embodiments of the device according to the invention, the coupling between said polarisation in said first sub-volume and the applied electric field, can, as understood from above, be ferroelectric, antiferroelectric or paraelectric, more advantageously ferroelectric.

Reference is made to WO 2003/081326 for further information on how to produce the above-disclosed sub-volume exhibiting an induced spontaneous polarisation.

In a third group of embodiments of the device according to the invention, the polarization of the liquid crystals of said first sub-volume is induced by splay and/or bend deformations of the liquid crystals in the sub-volume thereby providing a flexoelectric coupling between the liquid crystals in polarized state in said first sub-volume and the electrical field.

Flexoelectricic effect in liquid crystals is analogous to the piezoelectric effect in solid materials but quite different in its nature. Flexoelectricity means polarization of the liquid crystal material as a result of elastic deformation such as bend and/or splay deformation. It is pronounced in liquid crystal materials consisting of molecules that in addition to the permanent net dipole moments possess also "shape polarity". The total flexoelectric polarization $P_{flexo}$ is given by $P_{flexo}=e_sS+e_bB$, wherein $e_s$ is the splay flexoelectric coefficient and $e_b$ is the bend flexoelectric coefficient. These are very important parameters defining the strength of flexoelectric polarisation. $S=\bar{n}(\nabla.\bar{n})$ and $B=\bar{n}\times(\nabla\times\bar{n})$ are the splay and bend elastic deformation, respectively. In general, the stronger is the elastic deformation the larger is $P_{flexo}$. Although the flexoelectricity is a universal physical property of liquid crystals, there are liquid crystals that exhibit $P_{flexo}$ with different sign and such that have zero $P_{flexo}$.

As known to persons skilled in the art, a liquid crystalline material having splay and/or bend deformation induces a polarization which provides a flexoelectric coupling to an applied electric field (flexoelectric effect). In general, there exist splay deformation, bend deformation and asymmetrical hybrid (splay+bend) deformation.

To obtain the desired effects according to the invention, it is important that the flexoelectric effect in said first sub-volume is stronger than any possible flexoelectric effect of the bulk layer outside said sub-volumes (first and second sub-volume, respectively).

For example, this can be achieved by providing local splay and/or bend deformations in said first sub-volume by applying on one or both of the substrate surfaces an alignment layer having varying anchoring properties, for instance affecting the alignment direction, and/or protrusions extending into the sub-volume. The surface topography resulting from said protrusions can, alone or in combination with varying anchoring properties, give rise to flexoelectric polarization of adjacent liquid crystals.

In such a single-sided embodiment, it might be advantageous that an additional (second) alignment layer exhibiting a certain alignment direction, such as planar or hometropic, is applied on the inner surface of the other substrate.

A desired initial alignment of a liquid crystal layer in the absence of an electric field is generally achieved by appropriate surface treatment of the confining solid substrate surfaces, such as by applying a so-called (surface-director) alignment layer (also called orientation layer) on the confining substrate surfaces facing said liquid crystal bulk. The initial liquid crystal alignment is defined by solid surface/liquid crystal interactions. The orientation of the liquid crystal molecules adjacent the confining surface is transferred to the liquid crystal molecules in the bulk via elastic forces, thus imposing essentially the same alignment to all liquid crystal bulk molecules. The director of the liquid crystal molecules near the confining substrate surfaces is constrained to point in a certain direction, such as perpendicular to (also referred to as homeotropic or vertical) or in parallel with (also referred to as planar) the confining substrate surfaces. In some cases, planar) the confining substrate surfaces. In some cases, it might be advantageous to further orient the liquid crystal bulk molecules at a certain inclined orientation angle (pre-tilt angle) to the substrate.

An example of a method for establishing a homeotropic alignment comprises coating the confining substrate surfaces with a surfactant, such as lecithin or hexadecyltrimethyl ammonium bromide. The coated substrate surfaces is then also preferably rubbed in a predetermined direction, so that the field-induced planar alignment of the liquid crystal molecules will be oriented in the predetermined rubbing direction.

An example of a method for establishing a planar alignment is the so-called organic film rubbing method wherein an organic coating of, for instance, polyimide, is applied on a substrate surface. The organic coating is thereafter rubbed in a predetermined direction using a cloth, so that the liquid crystal molecules in contact with the layer will be oriented in the rubbing direction. FIGS. 4-19 exemplifies how flexoelectric polarization can be induced in a sub-volume adjacent a substrate surface bearing an electrode pattern as described above (the electrode pattern is not shown in the figures) by the surface topography and/or anchoring properties (including the alignment direction) of an alignment layer. The direction of flexoelectric polarisation is indicated by arrows in the figures and the dotted lines indicate the alignment directions of the liquid crystal molecules.

FIGS. 4-17 illustrate flexoelectric polarisation induced by alignment layers exhibiting pyramidal or rectangular surface topography and different kinds of alignment directions, such as hometropic and planar alignment. Methods for producing this kind of periodic surface topography are disclosed by D Flanders, D Shaver, and H Smith, Appl Phys Lett, 55, 2506 (1978); J Cheng, and G Boyd, Appl Phys Lett, 35, 444 (1979); G P Bryan-Brown, C V Brown, I C Sage, and V C Hul, Nature, V 392, 365 (1998); and C Brown, M Towler, V Hui, and G Bryan-Brown, Liquid Crystals, 27, 233 (2000).

Each one of FIGS. 4, 7 and 8 illustrates an alignment layer having a pyramidal topography and hometropic alignment (applied on the pyramidal protrusions). In FIG. 4, the substrate surface in-between said pyramidal protrusions also exhibits hometropic alignment. The opposite substrate surface comprises an additional alignment layer exhibiting planar alignment.

FIG. 5 illustrates an alignment layer having a pyramidal topography with hometropic alignment (applied on the pyramidal protrusions) and planar alignment in-between the pyramidal protrusions. The opposite substrate surface comprises an additional alignment layer exhibiting planar alignment.

Figure 13:
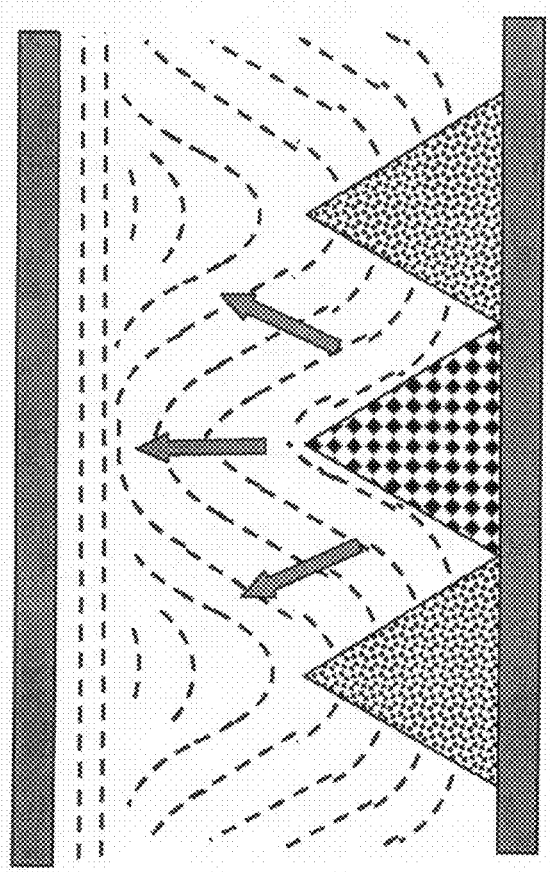
Figure 14:
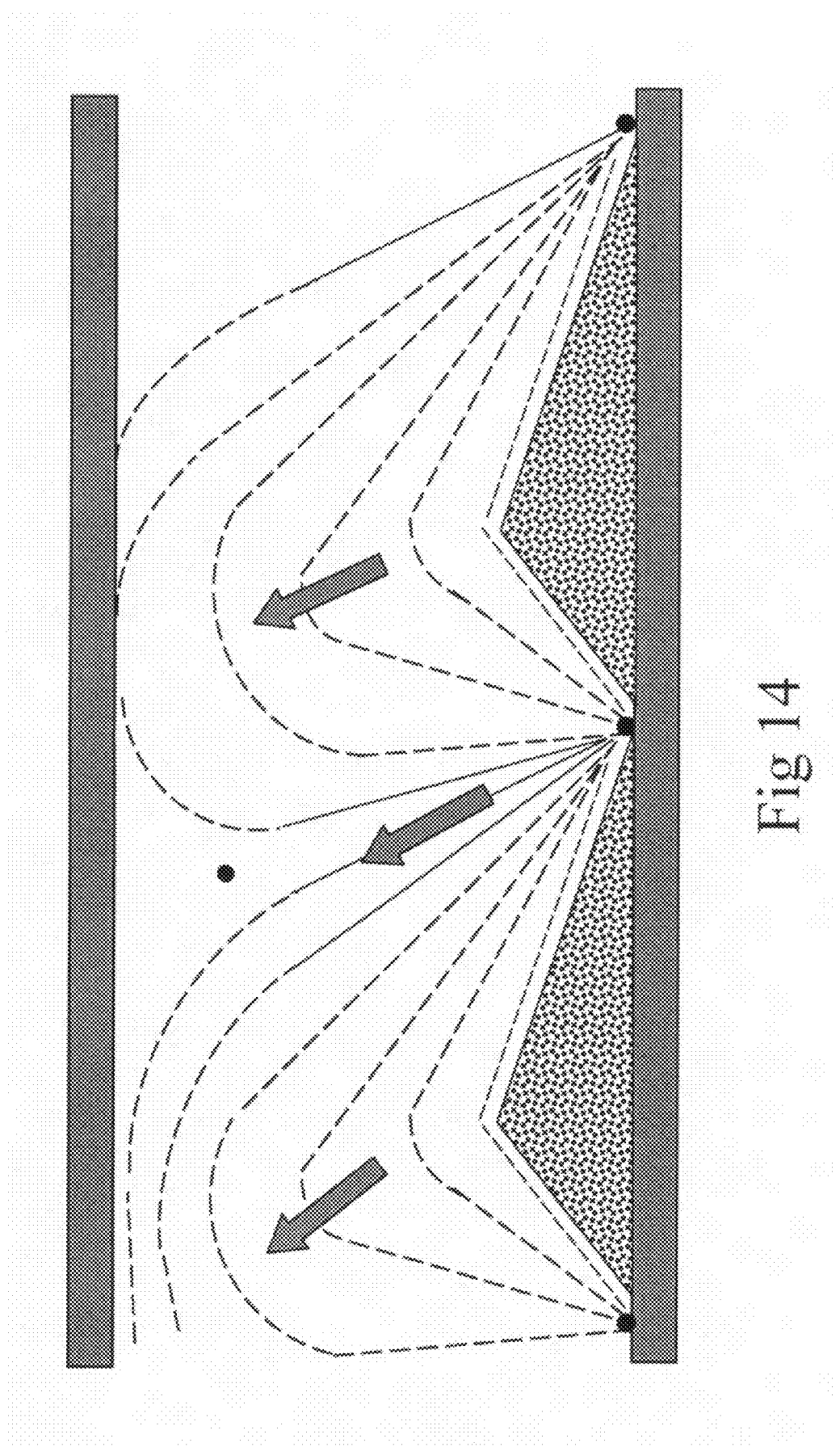

Each one of FIGS. 6, 13 and 14 illustrates an alignment layer having a pyramidal topography and planar alignment (applied on the pyramidal protrusions). In FIG. 6, the substrate surface in-between said pyramidal protrusions also exhibits planar alignment. The opposite substrate surface comprises an additional alignment layer exhibiting planar alignment.

FIG. 9 illustrates an alignment layer having a pyramidal topography and planar alignment (applied on the pyramidal protrusions). The opposite substrate surface comprises an additional alignment layer exhibiting hometropic alignment.

Figure 10:
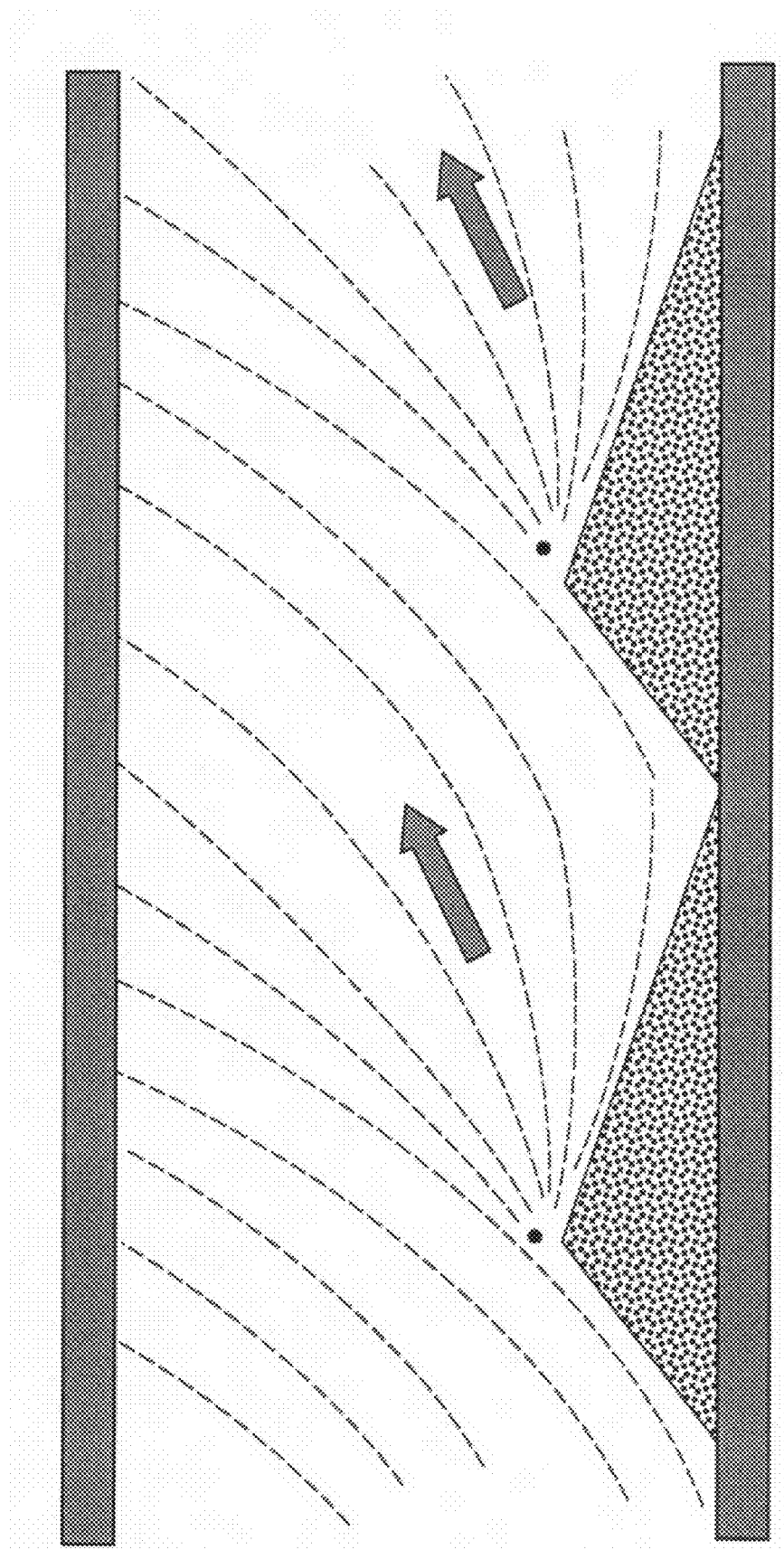

FIG. 10 illustrates an alignment layer having a pyramidal topography and planar alignment (applied on the asymmetric pyramidal protrusions). The opposite substrate surface comprises an additional alignment layer exhibiting hometropic alignment.

Figure 11:
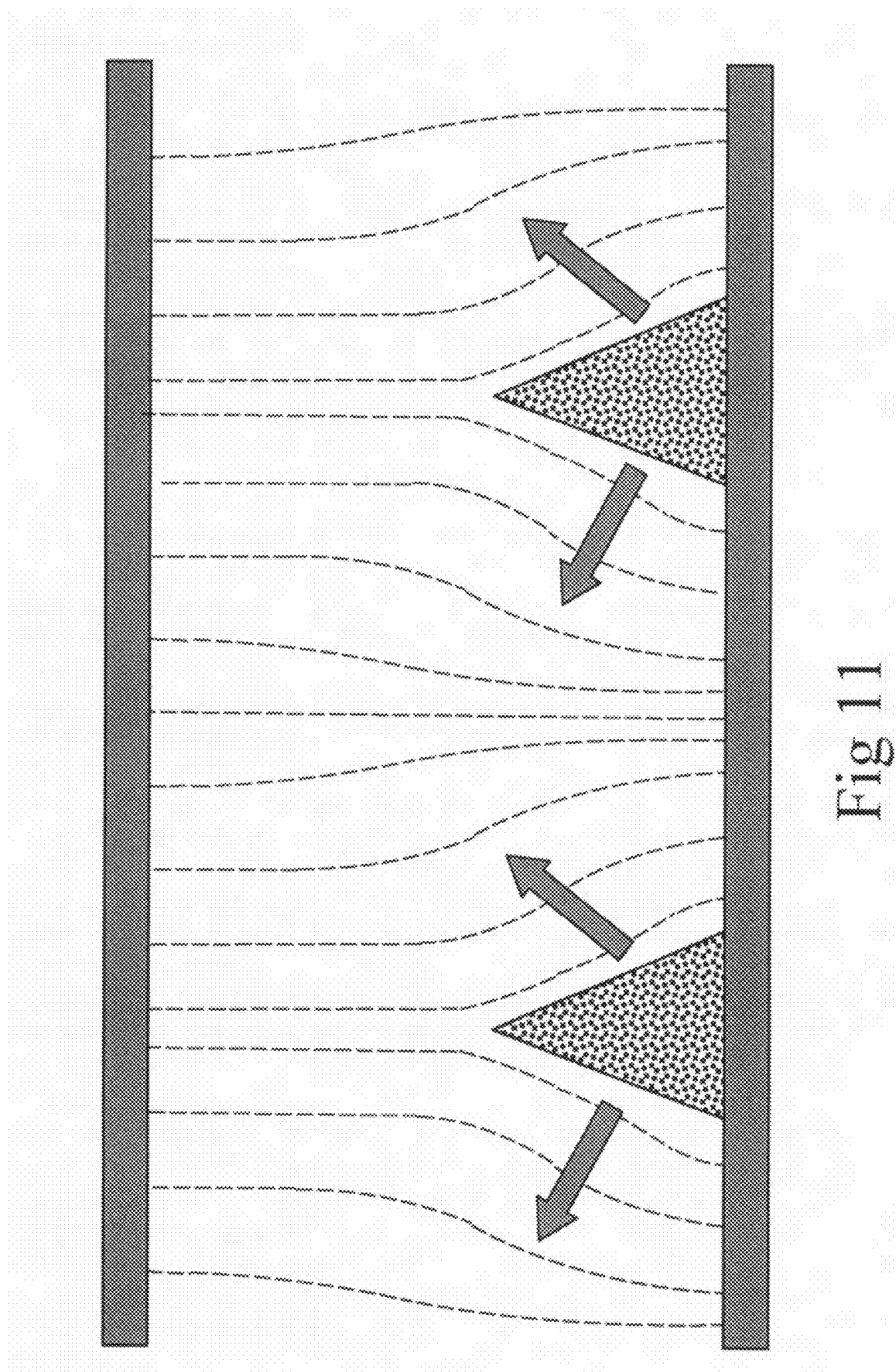

FIG. 11 illustrates an alignment layer having a pyramidal topography with planar alignment (applied on the pyramidal protrusions) and hometropic alignment in-between the pyramidal protrusions. The opposite substrate surface comprises an additional alignment layer exhibiting hometropic alignment.

Figure 12:
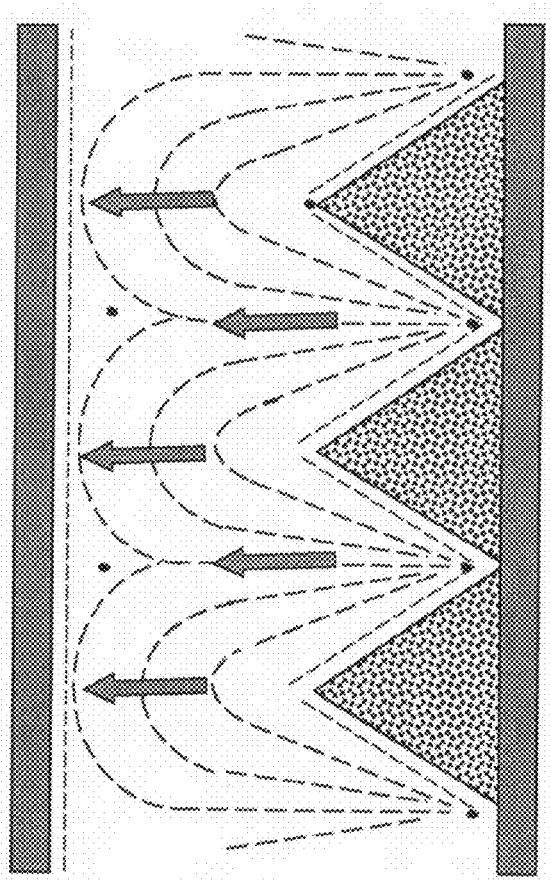

FIG. 12 illustrates an alignment layer having a pyramidal topography with alternating planar alignment and hometropic alignment (applied on the pyramidal protrusions). The opposite substrate surface comprises an additional alignment layer exhibiting planar alignment.

Figure 15:
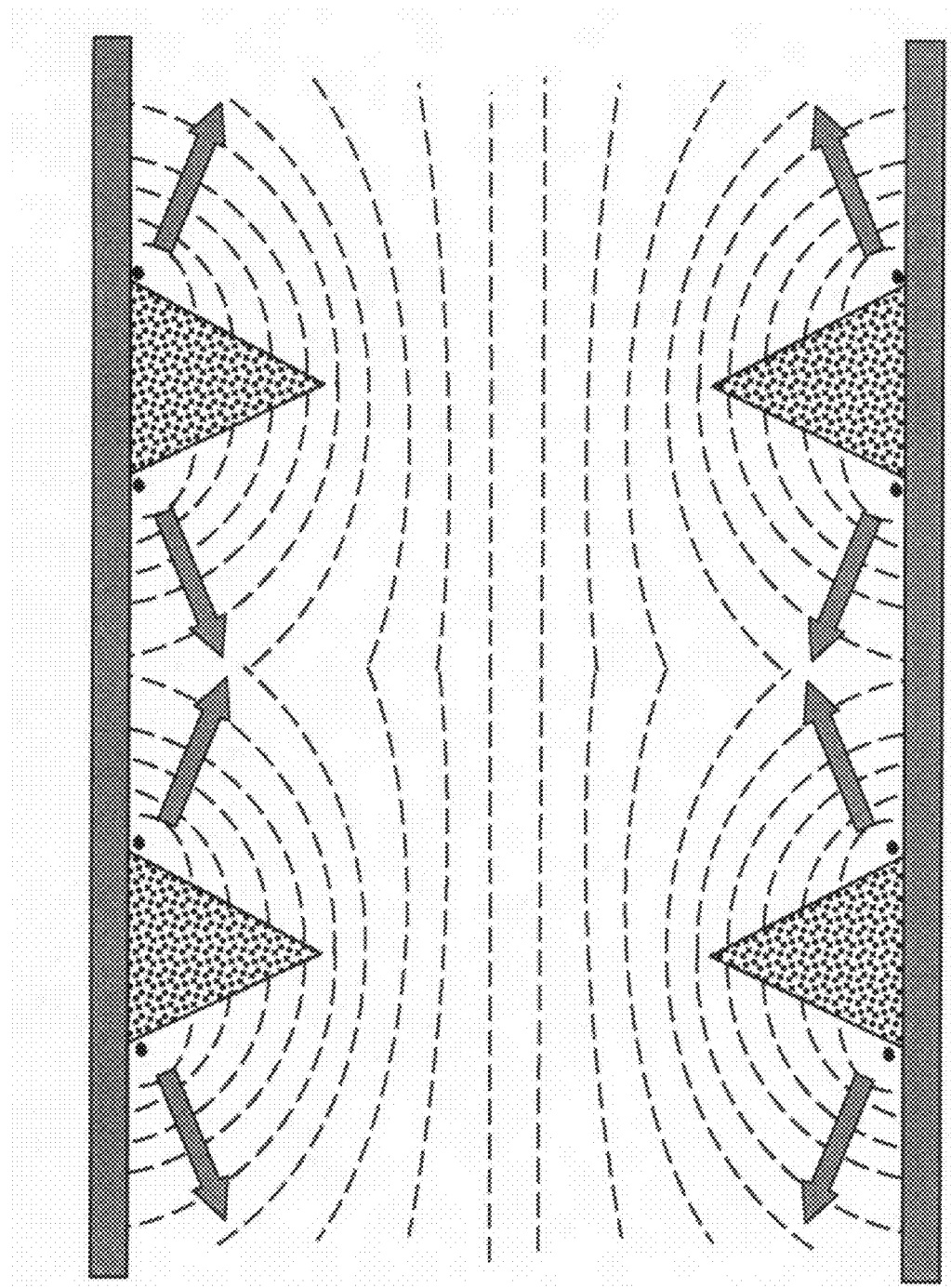
FIG. 15 is a schematic cross-section illustrating how flexoelectric polarization can be induced at the inner surface of each of the substrates by the surface topography and/or anchoring properties of the alignment layers in a device according to the invention.

FIG. 15 is a double-side embodiment of the single-sided embodiment shown in FIG. 4, wherein flexoelectric polarization is localized at the inner surface of each of the substrates.

Figure 16:
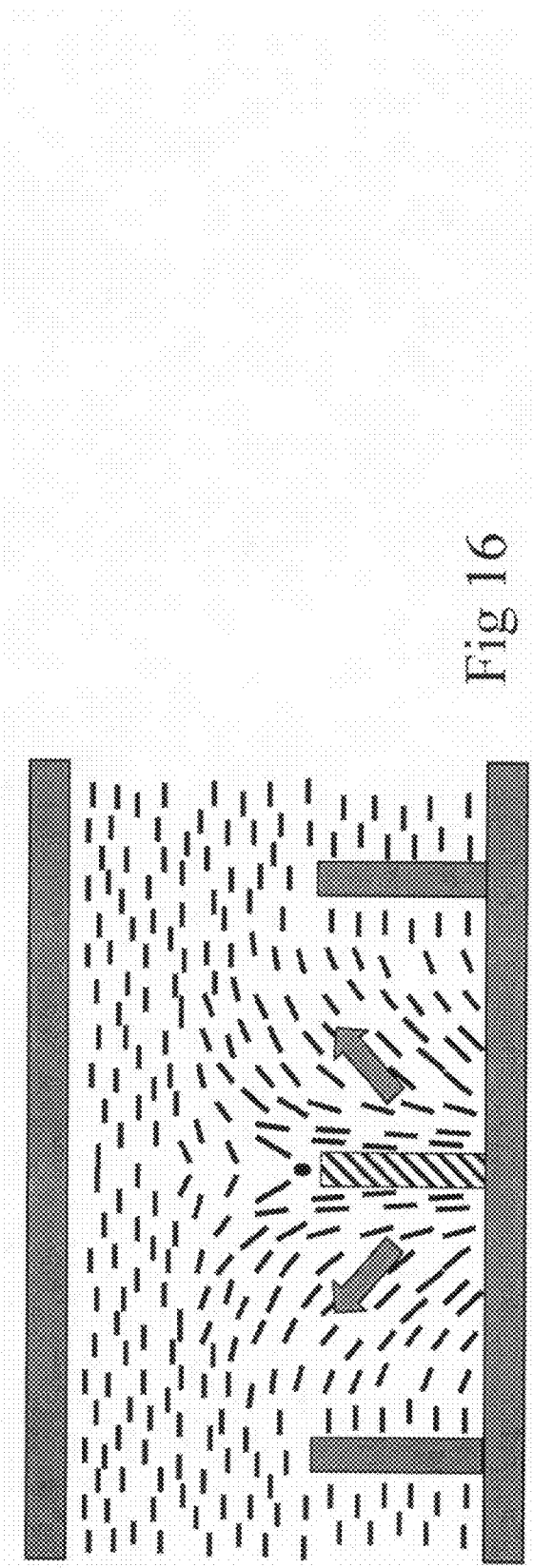

FIG. 16 illustrates an alignment layer having a rectangular topography with alternating planar alignment and hometropic alignment (applied on the rectangular protrusions).

Figure 17:
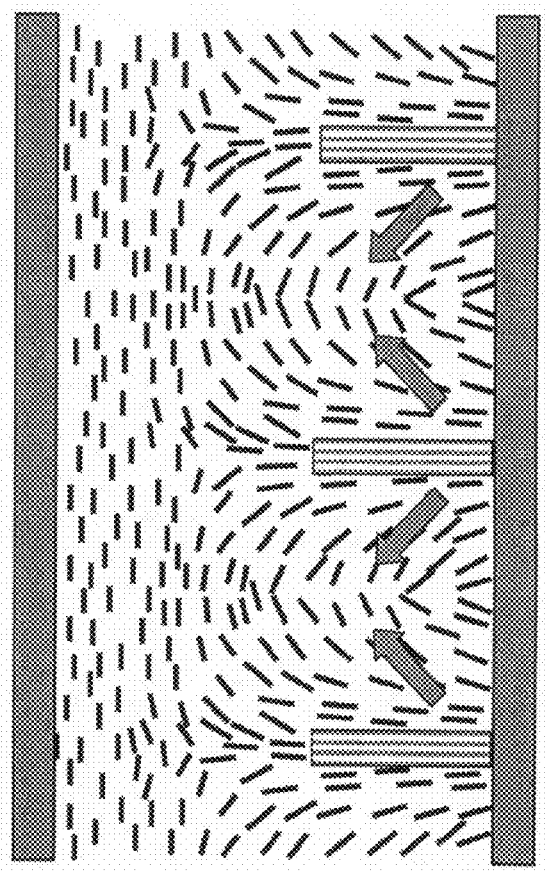

FIG. 17 illustrates an alignment layer having a rectangular topography with planar alignment (applied on the rectangular protrusions).

Figure 18:
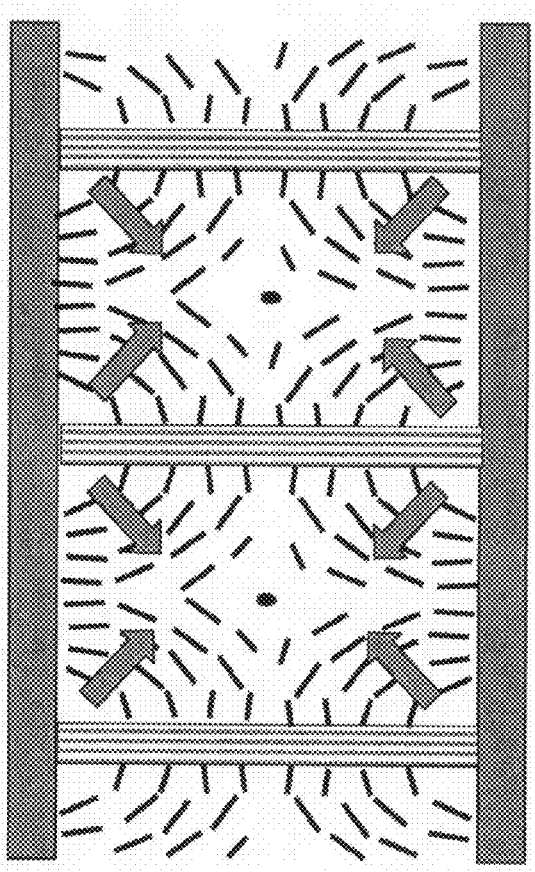
FIGS. 18 and 19 are schematic cross-sections illustrating how flexoelectric polarization can be induced by walls dividing the device gap in multiple cells in a device according to the invention.
Figure 19:
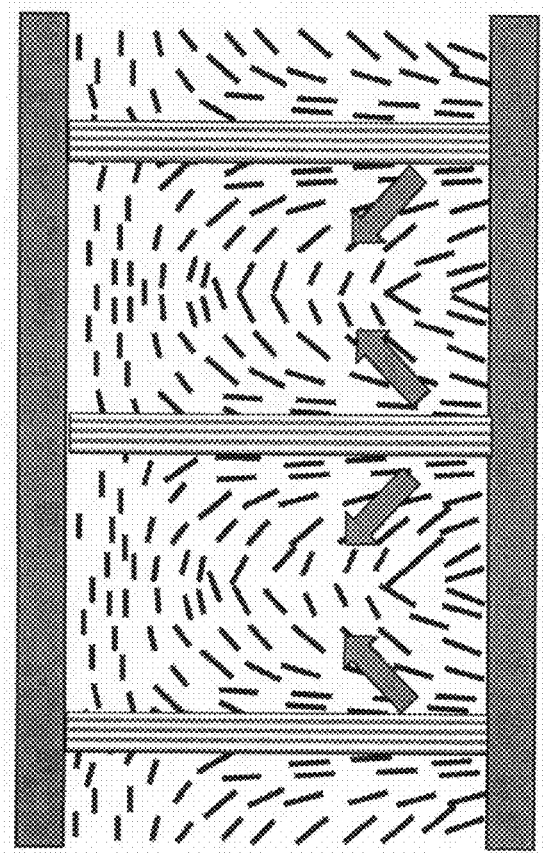

FIGS. 18 and 19 are schematic cross-sections of devices according the invention wherein flexoelectric polarization is generated by polymer walls dividing the device gap in multiple cells. Methods for producing this type of polymer walls are described by R Caputo, L De Sio, A V Sukhov, A Veltri and C Umeton, Opt Lett 29, 1261 (2004); and G Strangi, V Barna, R Caputo, A de Luca, C Versace, N Scaramuzza, C Umeton, and R Bartolino, Phys Rev Lett, 94, 063903 (2005).

Alternatively, splay and/or bend deformations can be provided in the entire bulk (i.e. bulk polarisation) in a device according to the invention.

Thus, a device according to the invention can comprise a bulk layer having an asymmetric splay-bend hybrid deformation, wherein the liquid crystals of the bulk layer exhibits a negative dielectric anisotropy ($\Delta\varepsilon<0$) and said first sub-volume comprises liquid crystals substantially exhibiting a bend deformation, or the liquid crystals of the bulk layer exhibits a positive dielectric anisotropy ($\Delta\varepsilon>0$) and said first ub-volume comprises liquid crystals substantially exhibiting a splay deformation.

In these cases, the flexoelectric effect in said first sub-volume is stronger than the flexoelectric effect of the bulk layer outside said first sub-volume.

It is also possible, in this third group of embodiments of the device according to the invention, to use a bulk layer having a splay deformation, wherein the liquid crystals of the bulk layer exhibits a positive dielectric anisotropy ($\Delta\varepsilon>0$). In this case, electrode patterns in accordance with the invention are suitably applied on both substrate surfaces thereby providing an inhomogeneous electric field over each strongly polarized sub-volume of the bulk layer adjacent to said electrode pattern.

Likewise, the bulk layer of the device according to this third group of embodiments can alternatively exhibit a bend deformation, wherein the liquid crystals of the bulk layer exhibits a negative dielectric anisotropy ($\Delta\varepsilon<0$). Also in this case, electrode patterns are suitably applied on both substrate surfaces.

If a device according to the invention as described above comprises a bulk layer having a symmetrical splay or bend deformation and an electrode pattern applied on only one substrate surface (single-sided embodiment), the flexoelectric polarization in said first sub-volume is equally strong as the flexoelectric polarization in the second sub-volume adjacent the inner surface of the substrate lacking an electrode pattern (but having an alignment layer applied thereon).

In this third group of embodiments, it is advantageous that the bulk layer comprises a nematic (chiral or achiral) liquid crystalline material. Furthermore, it is suitable that the liquid crystalline material of the bulk layer exhibits a pronounced flexoelectric polarization when deformed due to an elastic deformation. Thus, the liquid crystalline material of the bulk layer advantageously exhibit flexoelectric polarizability.

It shall be noted that the strength of the flexoelectric polarization depends on the magnitude and sign of the flexoelectric coefficients as well as the degree of elastic deformation, for instance, the flexoelectric polarization increases when the cell gap in the liquid crystal device decreases.

Furthermore, in this third group of embodiments, when the average direction of the flexoelectric polarisation, in field-off state, in said first sub-volume is parallel or tilted at an angle<90° with respect to said substrate having the electrode pattern applied thereon, and advantageously essentially orthogonal to the directions in which the in-plane electric field is to be generated, an in-plane switching of the liquid crystals of the bulk layer is accomplished.

In addition, the present invention relates to a method for producing the above described liquid crystal device according to the invention. Said method comprises:

applying an electrode pattern on the inner surface of a substrate, said electrode pattern being capable of generating an inhomogeneous electric field over a first sub-volume of a liquid crystal bulk layer adjacent to said electrode pattern and being inhomogeneous with regard to direction of field lines and strength thereof, optionally applying an alignment layer on said electrode pattern, said electric field being generated also over said optional alignment layer, forming a cell gap between said substrate having said electrode pattern and optional alignment layer applied thereon, and a second substrate, filling the cell gap with a liquid crystalline material forming a liquid crystal bulk layer, providing liquid crystals in a polarized state in said first sub-volume and/or in said optional alignment layer, said polarization being stronger than any possible similar liquid crystal polarization of the bulk layer outside said first sub-volume, said alignment layer and/or a second sub-volume of the bulk layer adjacent the inner surface of the second substrate, or an optional second alignment layer or an optional second electrode pattern applied thereon, and capable of coupling with said electric field to perform switching of said liquid crystals for accomplishing via elastic forces a switching of the liquid crystals of the bulk layer.

Other preferred features of the above method are understood from the above description of the liquid crystal device according to the invention.

The invention will now be illustrated by means of the following non-limiting examples.

EXAMPLE 1

Cell Comprising Bulk Layer with Hybrid Alignment (HAN) and Interdigitated Electrodes A sandwich cell (FIG. 20) comprising two parallel glass substrates 9 and 10 forming a cell gap of about 2 μm was used. An interdigitated electrode pattern 11 (illustrated in FIG. 1) were provided on the inner surface of one of the substrates 9 (single-sided device). The distance between adjacent electrodes was about 20 μm.

A first alignment layer 12 consisting of Nissan SE-2170 was deposited on the electrode pattern 11 and rubbed parallel to the electrode pattern 11 for promoting an uniform planar alignment of a liquid crystal bulk layer, comprising liquid crystal molecules 13, provided in the cell gap.

A second alignment layer 14 consisting of Nissan SE1211, promoting homeotropic alignment, was deposited on the inner surface of the other substrate 10.

The cell gap was filled with the nematic liquid crystalline material MLC 16000-000 (supplied by Merck) possessing positive dielectric anisotropy ($\Delta\epsilon>0$).

Due to the orientations of the alignment layers 12 and 14, the nematic bulk 13 adopted a hybrid alignment (HAN), i.e. at the substrate 9 bearing the electrode pattern 11 the alignment is planar while at the other substrate 10 the alignment is homeotropic (FIG. 20 and FIG. 21). Such elastic deformation of the nematic bulk layer 13 gives rise to a flexoelectric polarization ($P_{flexo}$). The double-sided arrow in FIGS. 21-23 indicates the direction of the sample optic axis.

Since the splay deformation is localized at the substrate 9 bearing the electrode pattern 11 and since MLC 16000-000 exhibits a positive dielectric anisotropy, the strongest flexoelectric polarization is here localized where the splay deformation is dominant, i.e. at the substrate 9 bearing the electrode pattern 11 (FIG. 20).

The elastic deformation and the flexoelectric polarization are lying in the same plane parallel to the electrode pattern 11 and perpendicular to the cell substrates 9 and 10. The flexoelectric polarization couples linearly to the applied electric field (E) providing a fast switching of the liquid crystals 13. The measured total switching time ($\tau_{rise}+\tau_{fall}$), was about 8-12 ms at an applied voltage of 25 V. The total switching time at the same conditions is about 28-34 ms for a conventional IPS liquid crystal device.

FIG. 22 and FIG. 23, respectively, schematically shows the switching of the nematic liquid crystals 13 in a single electrode gap. As seen from these two figures the direction of the switching depends on the polarity of the electric field (E). The nematic LC molecules 13 in two adjacent electrode gaps switch clockwise and anti-clockwise, respectively, as shown in FIG. 24 and FIG. 25. These figures represent two states of the cell corresponding to different field polarity of the applied electric field (E). The cell is viewed between crossed polarisers, with λ-red optical plate inserted in-between. Different colours correspond to different position of the director n (shown with arrows in FIGS. 24 and 25) with respect to the optic axis of the i-red optical plate.

EXAMPLE 2

Cell Comprising Bulk Layer with Hybrid Alignment (HAN) and Interdigitated Electrodes The same type of sandwich cell was used in this example as in the Example 1, but the HAN texture was reversed (FIG. 26). Thus, the alignment induced by the first alignment layer 18 at the substrate 15 bearing the electrode pattern 17 was homeotropic and the alignment induced by the second alignment layer 20 at the counter substrate 16 was planar, as shown in the FIG. 26 and FIG. 27.

In addition, the cell was filled with another nematic liquid crystalline material 19, MDA-05-187 (supplied by Merck) possessing a negative dielectric anisotropy ($\Delta\epsilon<0$).

Since the bend deformation is localized at the sub-strate 15 bearing the electrode pattern 17 and since MDA-05-187 exhibits a negative dielectric anisotropy, the strongest flexoelectric polarization ($P_{flexo}$) is here localized where the bend deformation is dominant, i.e. at the substrate 15 bearing the electrode pattern 17 (FIG. 26). The double-sided arrow in FIGS. 27-29 indicates the direction of the sample optic axis.

Figure 30:
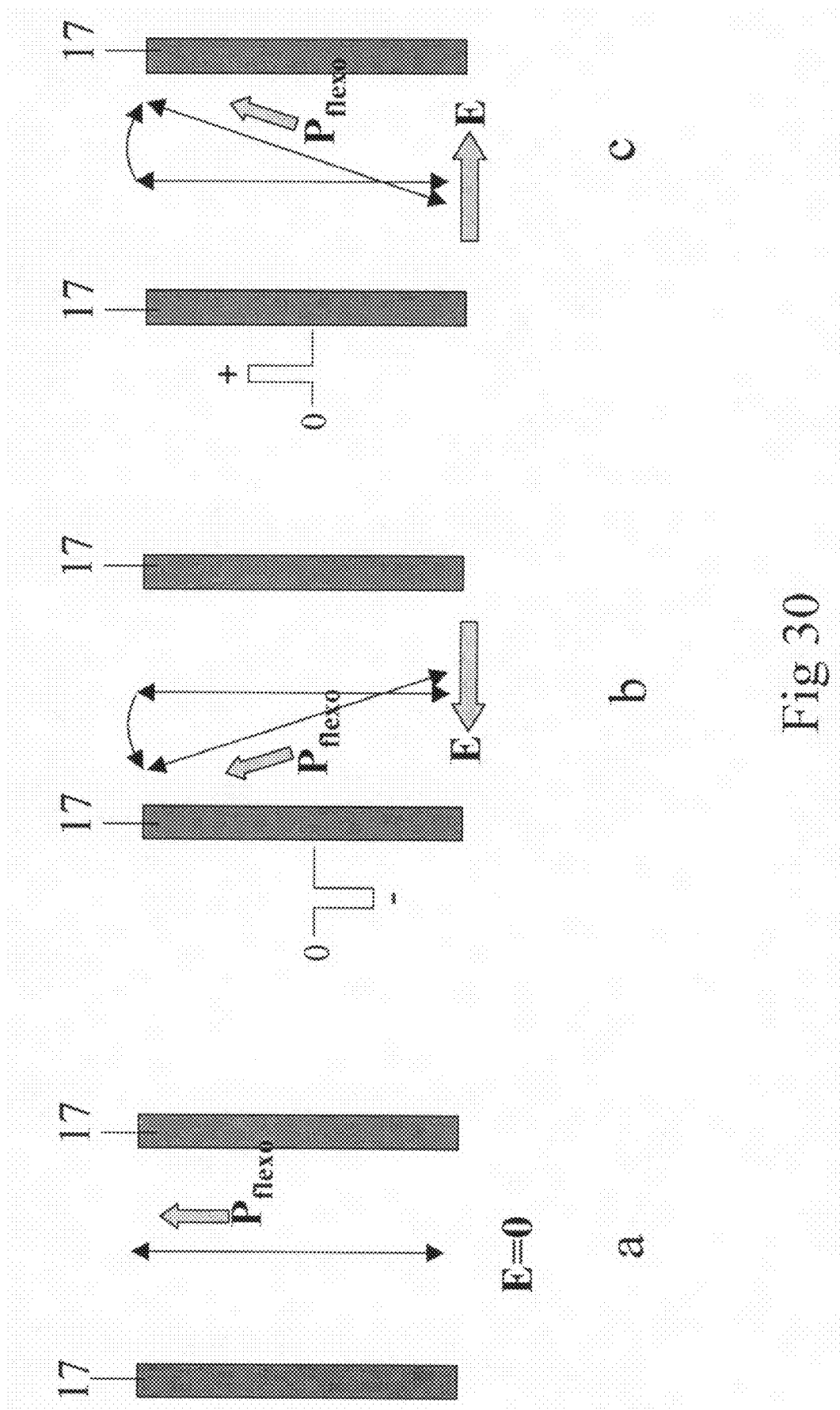
Figure 31:
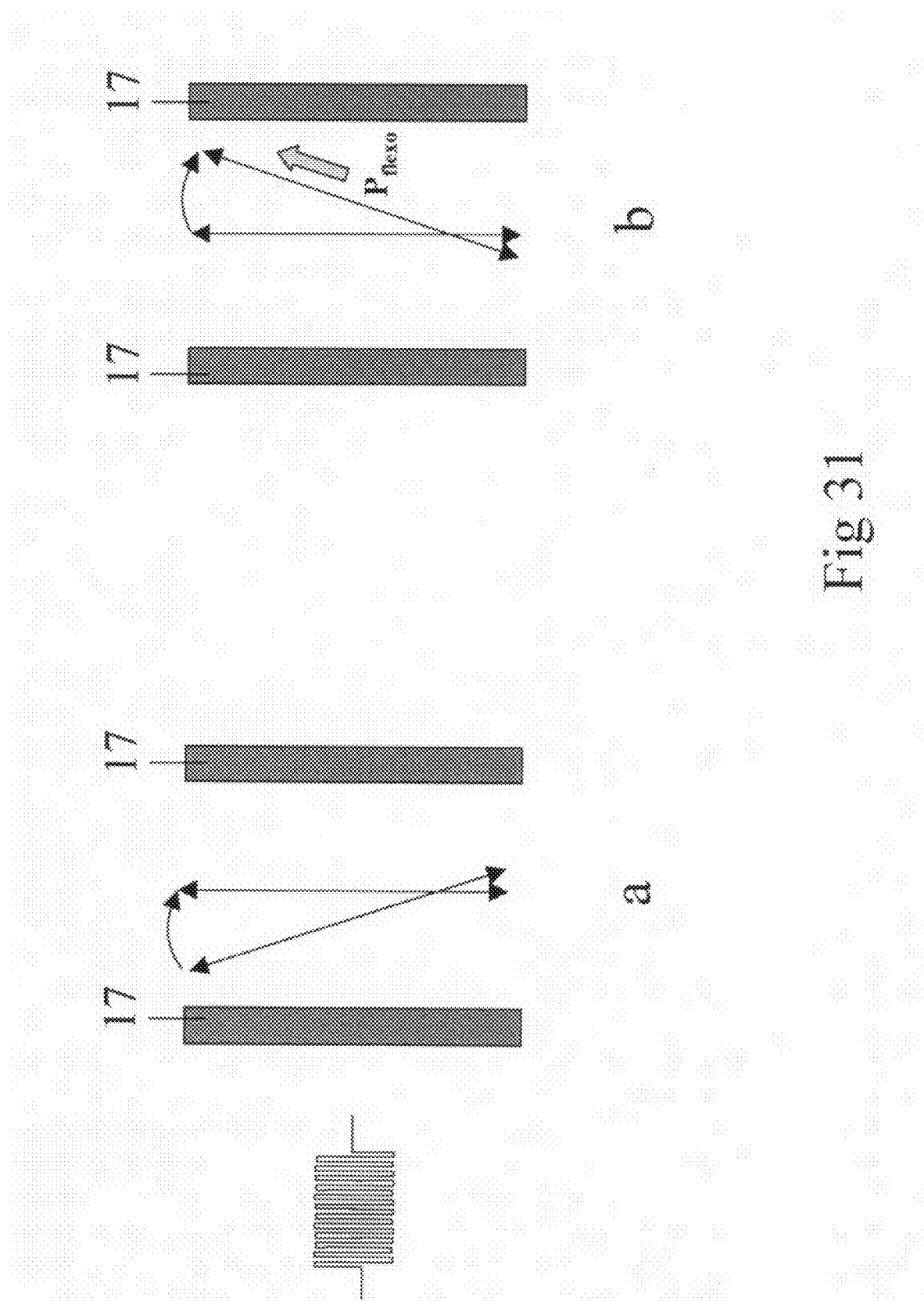

The switching, including the switching time, of the nematic was found to be similar to the switching described in Example 1 and is shown schematically in FIG. 28 and FIG. 29. However, contrary to the switching described in Example 1, where the flexoelectric coupling ($P_{flexo}$) and the dielectric coupling have the same direction, in this example these couplings have opposite directions. At weak or moderate electric field the flexoelectric coupling ($P_{flexo}$) will dominate over the dielectric coupling between the electric field (E) and the dielectric anisotropy. However, at strong electric field (E) and high frequency the dielectric coupling is dominating. Hence, by first applying a dc voltage to the electrodes, the nematic molecules 19 switch due to the flexoelectric coupling clockwise and anti-clockwise, respectively, depending on the polarity of applied electric field (E) in the corresponding electrode gap. A strong high frequency pulse is switching back the nematic 19 due to the dielectric coupling. Consequently by applying a dc voltage, the nematic 19 is switched on (FIGS. 30a, 30b and 30c) whereas a high frequency pulse switches back the nematic 19 to the initial field-off preferred direction of alignment (illustrated by the double-sided arrow in FIG. 30 and FIG. 31) which, as in the Example 1, is parallel to the electrodes 17 (FIGS. 31a and 31b).

EXAMPLE 3

Cell Comprising Chiral Smectic Alignment Layer and Interdigitated Electrodes The cell used in this example (FIG. 32) had the same structure as the one used in Example 1. However, in this example, both inner surfaces of the substrates 21 and 22 were coated with alignment layers (not shown) comprising Nissan SE-2170 unidirectionally rubbed along the electrodes 23 promoting a quasi-planar alignment with pretilt $\theta_a$.

On top of the alignment layer covering the electrode pattern 23, a thin film of ferroelectric liquid crystal polymer (FLCP), more specifically a ferroelectric side-chain polysiloxane, (not shown) was deposited. The FLCP layer had a molecular tilt $\theta_b$ and was aligned in bookshelf geometry, i.e. with smectic layers perpendicular to the substrate surface 21.

The cell gap was filled with an in-house prepared nematic liquid crystalline material 24 possessing a negative dielectric anisotropy ($\Delta \varepsilon < 0$) and being immiscible (insoluble) in the FLCP.

The applied electric field (E) in this example does not directly switch the nematic molecules 24 due to its negative dielectric anisotropy. However, the electric field (E) switches the molecules of the FLCP due to the spontaneous polarization of the FLCP material, which in turn switches the nematic liquid crystalline molecules 24 of the bulk layer via elastic forces (see WO 00/03288). Hence, by changing the field polarity (E), the preferred direction of alignment of the nematic bulk 24 is switched in the plane of the substrates 21 and 22 (i.e. in-plane switching).

Figure 33:
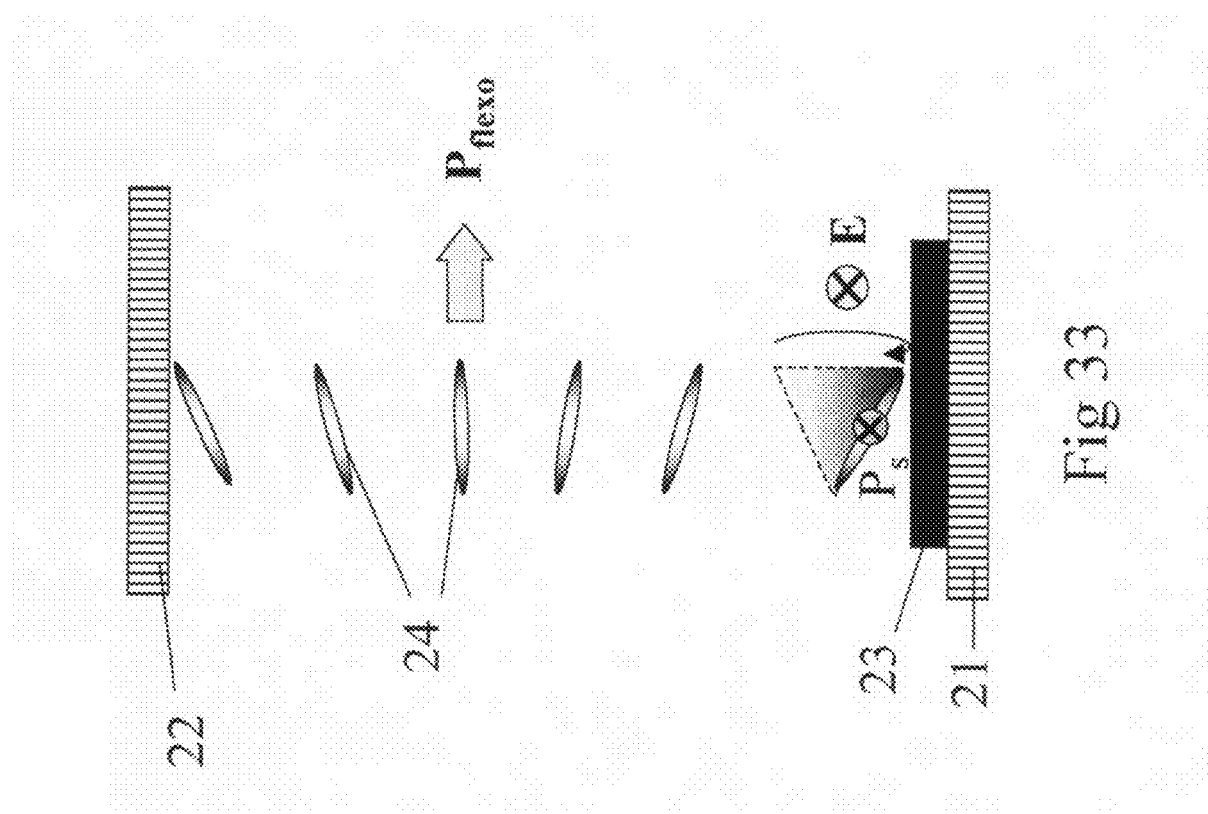
FIGS. 32-36 illustrate the structure and performance of a device according to the invention comprising a ferroelectric alignment layer and interdigitated electrodes.
Figure 32:
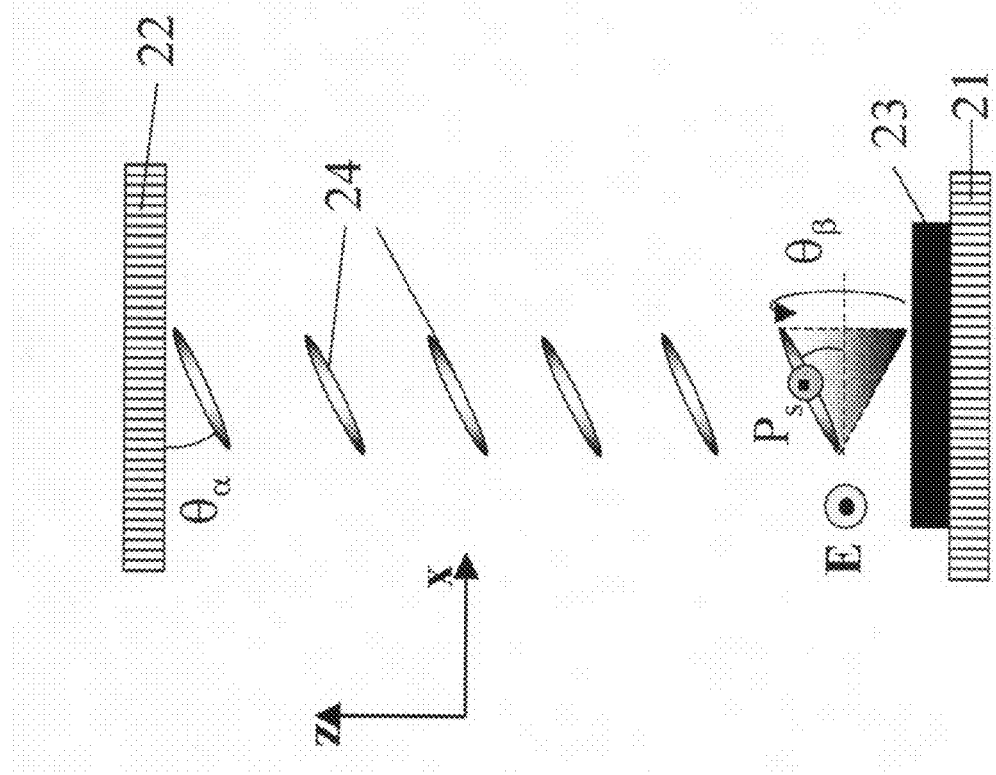

As seen from the FIG. 32, at one field polarity (E) the molecular pretilt has a homogeneous distribution across the nematic bulk 24, whereas at the other field polarity (E) the nematic bulk 24 adopts splay deformation which gives rise to a flexoelectric polarization ($P_{flexo}$), as shown on FIG. 33. However, similar to the spontaneous polarisation ($P_s$) of the FLCP layer, the flexoelectric polarization ($P_{flexo}$) couples linearly to the electric field (E) resulting in in-plane switching.

Similar to Example 1 and Example 2, the total switching time ($\tau_{rise} + \tau_{fall}$) was found to be about 8-12 ms at an applied voltage of 25 V.

If the pretilt $\theta_\alpha$ at the substrate 22 without electrodes 23 is lower than the pretilt $\theta_\beta$ at the substrate 21 bearing the electrode pattern 23, the strongest flexoelectric polarization ($P_{flexo}$) will essentially be localized at the surface 21 bearing the electrode pattern 23 thereby providing a stronger coupling to the applied electric field (E) and enabling a more efficient switching of the nematic 24 (i.e. a shorter switching time).

EXAMPLE 4

Figures 34, 35:
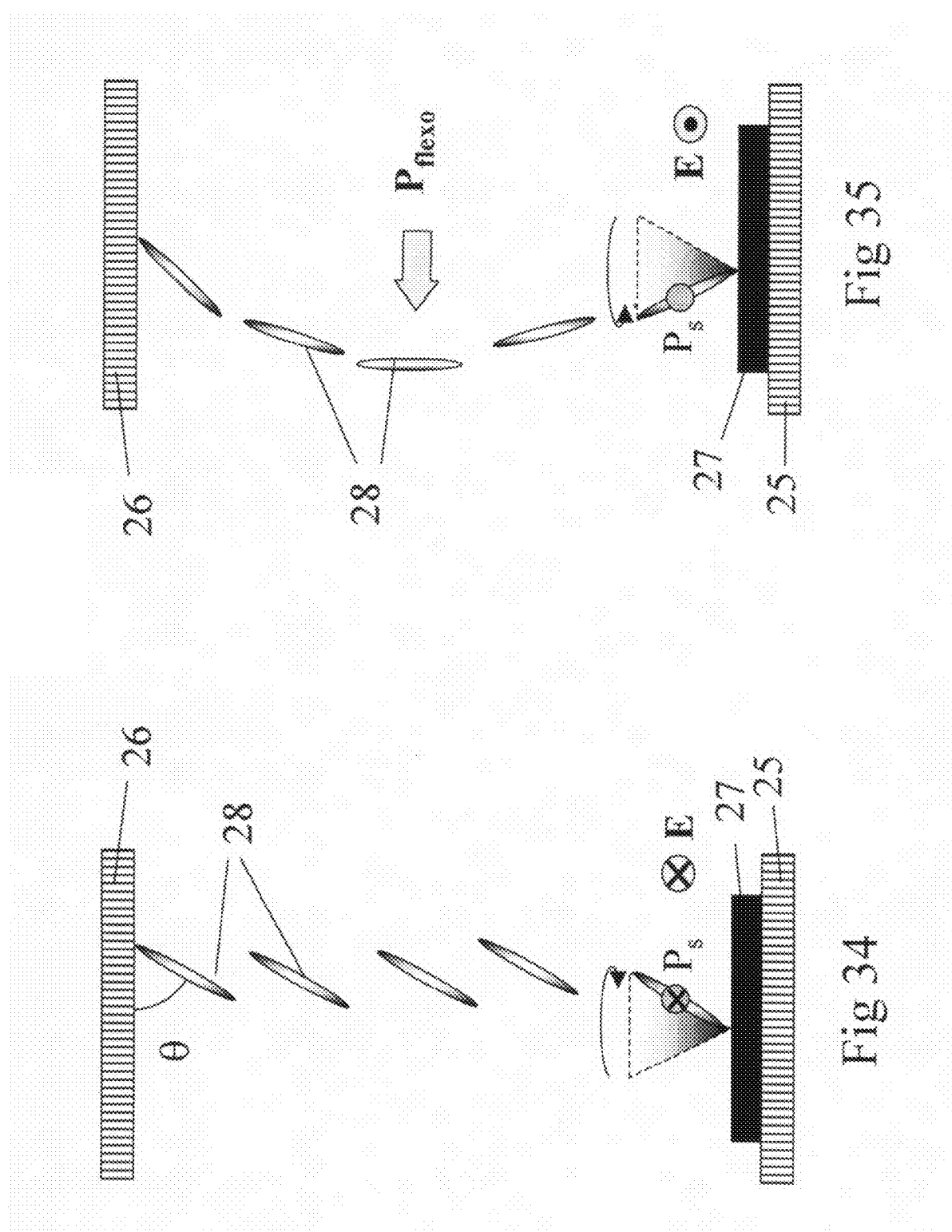

Cell Comprising Chiral Smectic Alignment Layer and Interdigitated Electrodes The cell used in this example (FIG. 34) had the same structure as the one used in Example 3. However, in this example, both inner surfaces of the substrates 25 and 26 were coated with alignment layers (not shown) unidirectionally rubbed along the electrode pattern 27 promoting quasi-homeotropic alignment with a pretilt ($\theta$) of less than 90° (FIG. 34). Moreover, the FLCP layer (not shown) was aligned with the smectic layers parallel to the substrate 25.

As seen from the FIG. 34, at one field polarity (E) the molecular pretilt has a homogeneous distribution across the nematic bulk 28, whereas at the other field polarity (E) the nematic bulk 28 adopts bend deformation which gives rise to a flexoelectric polarization ($P_{flexo}$), as shown in FIG. 35, said polarization ($P_{flexo}$) coupling linearly to the electric field (E) resulting in in-plane switching.

Figure 36:
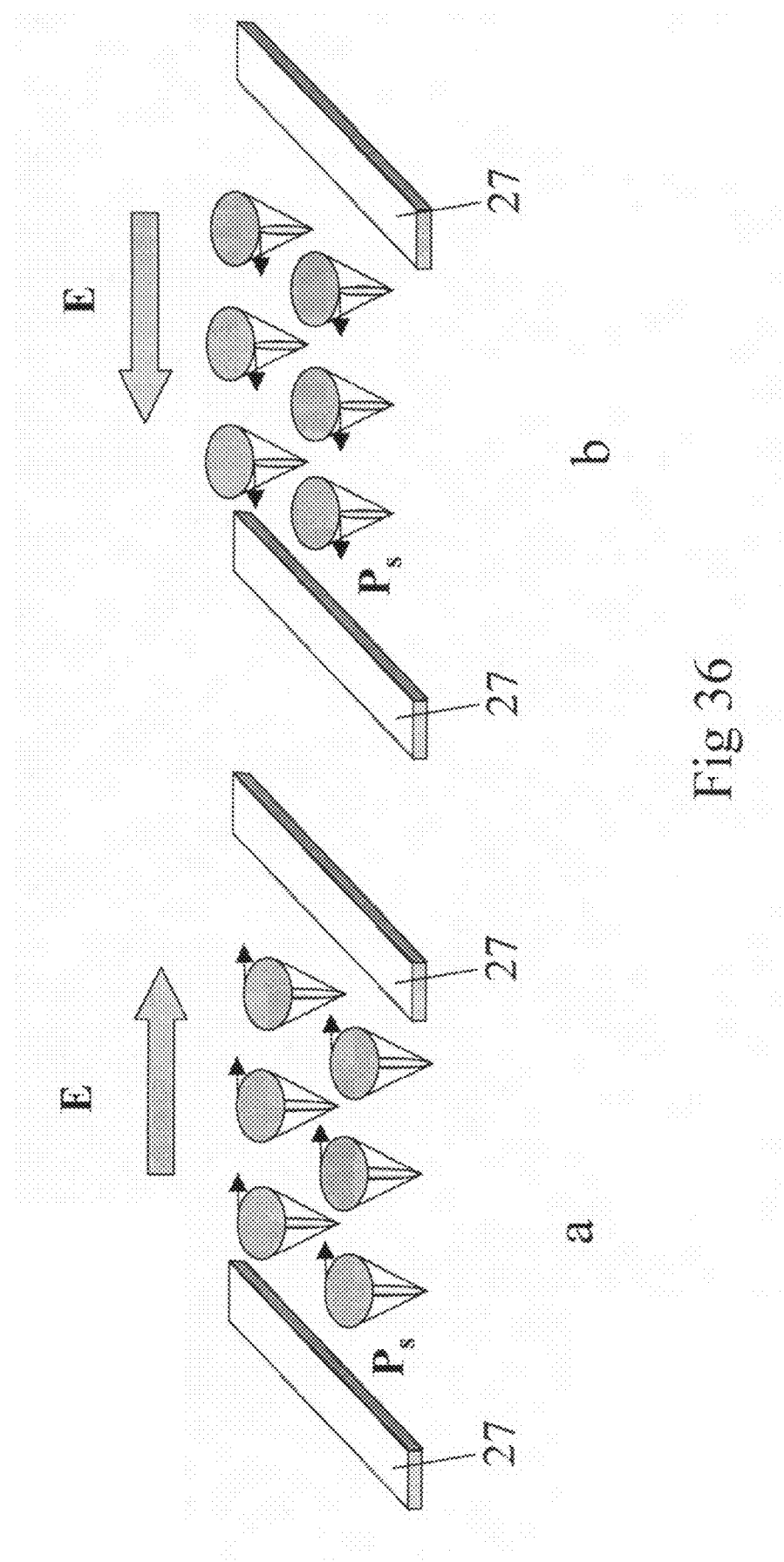

The switching of the FLCP layer is schematically illustrated in FIGS. 36a and b.

The switching, including the switching time, of the nematic bulk 28 was found to be similar to the switching described in Example 3.

EXAMPLE 5

Cell Comprising Bulk Layer with Hybrid Alignment (HAN) and Comb-Like Electrode Generating Fringe Field A sandwich cell comprising two parallel glass substrates 29 and 30 forming a cell gap of about 2 μm was used in this example (FIG. 37). An electrode pattern comprising a first conductive layer 31, an isolation layer 32 having a thickness of about 300 nm, and a second conductive layer 33 having a comb-like form was provided on the inner surface of one of the substrates 29 (single-sided device) (FIG. 37). The distribution of the components of the fringe electric field generated by this electrode pattern is schematically presented in FIG. 3.

As in Example 2, a first alignment layer 34 consisting of Nissan SE1211, promoting homeotropic alignment of a liquid crystal bulk layer 35 provided in the cell gap, was deposited on the substrate 29 bearing the comb-like electrode 33.

As in Example 2, a second alignment layer 36 consisting of Nissan SE-2170 was deposited on the inner surface of the other substrate 30 and rubbed parallel to the electrodes 31 and 33 for promoting an uniform planar alignment of said liquid crystal bulk layer 35 provided in the cell gap.

As in Example 2, the cell gap was filled with the nematic liquid crystalline material MDA-05-187 possessing a negative dielectric anisotropy ($\Delta \varepsilon < 0$).

Thus, the nematic liquid crystal 35 filling the cell gap adopts a HAN structure (FIG. 37 and FIG. 38) and the strongest flexoelectric polarization ($P_{flexo}$) is localized near the substrate 29 bearing the comb-like electrode 33. The double-sided arrow in FIGS. 38-40 indicates the direction of the sample optic axis.

As shown in FIG. 39 and FIG. 40, the parallel component of the fringe electric field (E) switches the flexoelectric polarization ($P_{flexo}$) adjacent two parallel sides of the comb-like electrode 33 in-plane, clockwise and anti-clockwise, respectively, thereby giving rise to a substantial electro-optic response.

As shown in FIG. 41 and FIG. 42, the perpendicular component of the fringe field (E), however, switches the flexoelectric polarization ($P_{flexo}$) in the middle between the two parallel sides of the comb-like electrode 33 out-of-plane, which does not give rise to an electro-optical response.

It was shown that a displayed image of this device have a high contrast, FIG. 43 presenting the field-on state and FIG. 44 presenting the field-off state.

In addition, due to the in-plane switching, the device also possesses wide viewing angle.

Moreover, the required voltage for driving the switching of the nematic bulk 35 in this device is about 6 V, which is much lower than the voltage required for a conventional IPS display (15-20 V).

The total switching time ($\tau_{rise}+\tau_{fall}$) of this device was found to be about 3 ms. The rise time (arise) was about 2 ms and the fall time (($\tau_{fall}$) was about 0.9 ms. Thus, the switching time was much shorter than for a conventional IPS display.

EXAMPLE 6

Cell Comprising Bulk Layer with Hybrid Alignment (HAN) and Comb-Like Electrode for Generating Fringe Field The same type of sandwich cell was used in this example as in the Example 5, but the HAN texture was reversed. Thus, the alignment at the substrate bearing the electrodes was planar and the alignment at the counter substrate was hometropic (i.e. similar to Example 1).

In addition, the cell gap was filled with another nematic liquid crystalline material, MLC 16000-000 (supplied by Merck) possessing a positive dielectric anisotropy ($\Delta\epsilon>0$), which also was used in Example 1.

As in Example 1, the nematic liquid crystal adopts a HAN structure and the strongest flexoelectric polarization ($P_{flexo}$) is localized near the substrate bearing the comb-like electrode.

The switching, including the switching time, of the nematic was found to be similar to the switching described in Example 5.

EXAMPLE 7

Figure 45:
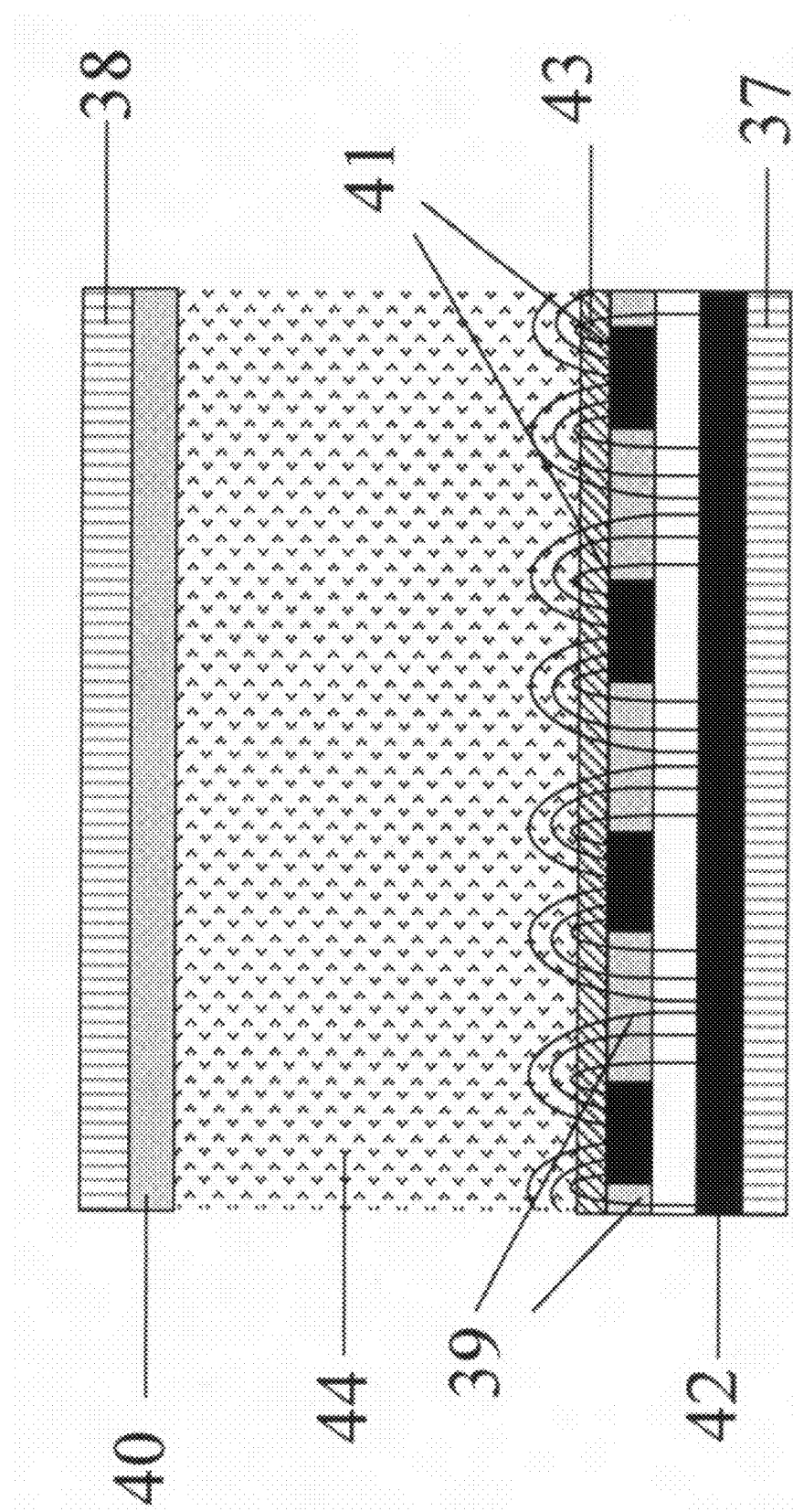

Cell Comprising Chiral Smectic Alignment Layer and a Comb-Like Electrode for Generating Fringe Field The cell used in this example (FIG. 45) had the same structure as the one used in Example 5. However, in this example, both inner surfaces of the substrates 37 and 38 were coated with alignment layers 39 and 40 of Nissan SE-2170 rubbed parallel to the comb-like electrode 41 for promoting an unidirectional planar alignment.

On top of the alignment layer 39 covering the electrodes 41 and 42 a thin film of ferroelectric liquid crystal polymer (FLCP) 43, more specifically a ferroelectric side-chain polysiloxane, was deposited. The FLCP layer 43 was aligned in bookshelf geometry, i.e. with smectic layers perpendicular to the substrate surface 37. The cell gap was filled with an in-house prepared nematic liquid crystalline material 44 possessing a negative dielectric anisotropy ($\Delta\epsilon<0$) and being immiscible (insoluble) in the FLCP 43.

As in Example 3, the electric field (E) does not directly switch the nematic molecules 44 due to its negative dielectric anisotropy. However, the electric field (E) does switch the molecules of the FLCP 43 due to the spontaneous polarization of the FLCP material 43, which in turn switches (in-plane switching) the nematic liquid crystalline molecules 44 of the bulk layer via elastic forces (see WO 00/03288) (FIG. 47 and FIG. 48).

Figure 51:
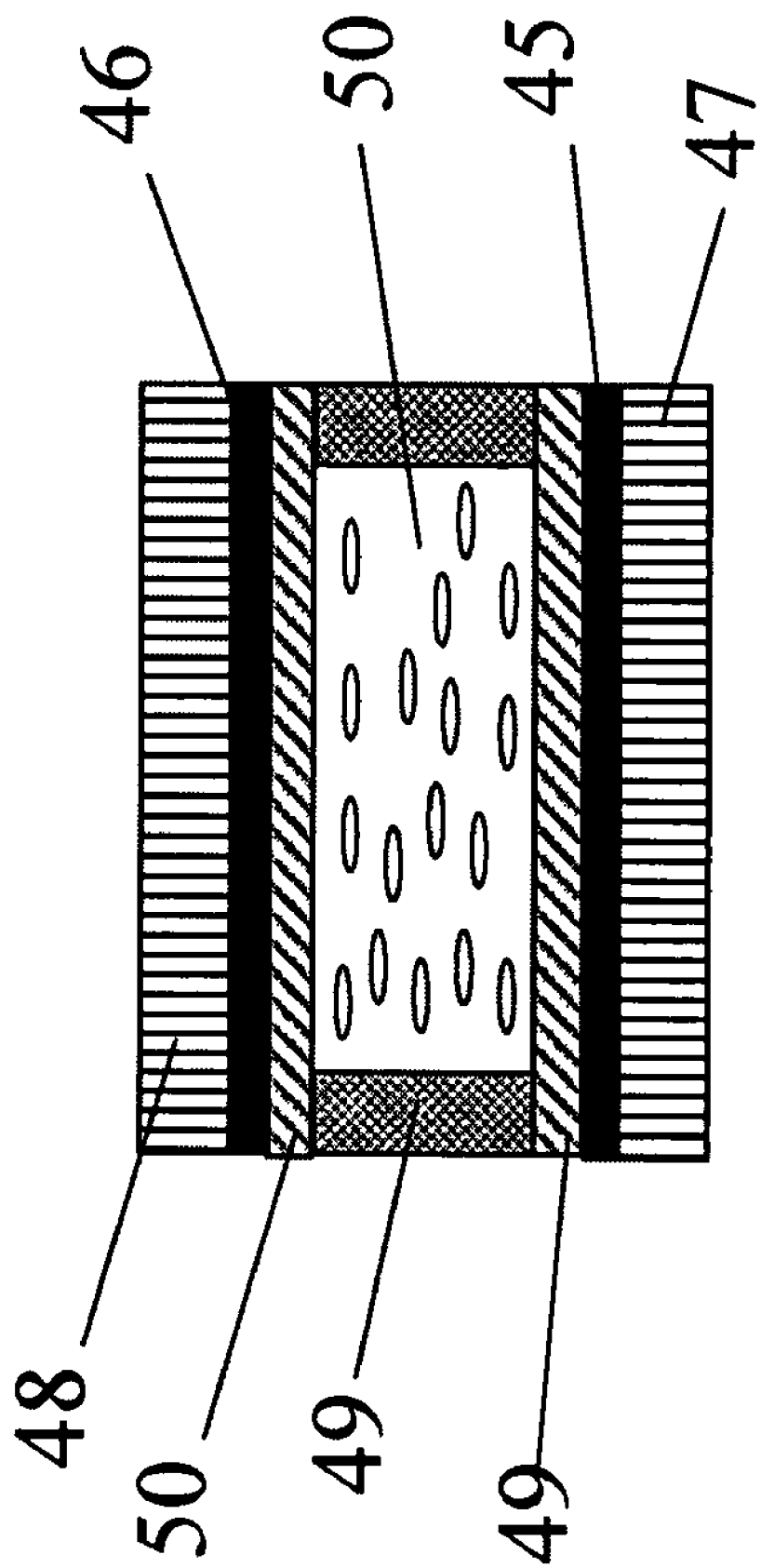

Switching of the FLCP molecules 43 by applying a fringe field (E) has been found to be more efficient than by applying an electric field over the entire bulk (i.e. an electric field generated between electrodes applied on separate substrate surfaces), as depicted in FIG. 51. The device shown in FIG. 51 comprises ITO electrodes 45 and 46 applied on each of the substrate surfaces 47 and 48, respectively, and FLCP layers 49 and 50 applied on said ITO electrodes 45 and 46. The cell gap, separated by spacers 51, is filled with an achiral nematic liquid crystalline material 52.

Figure 49:
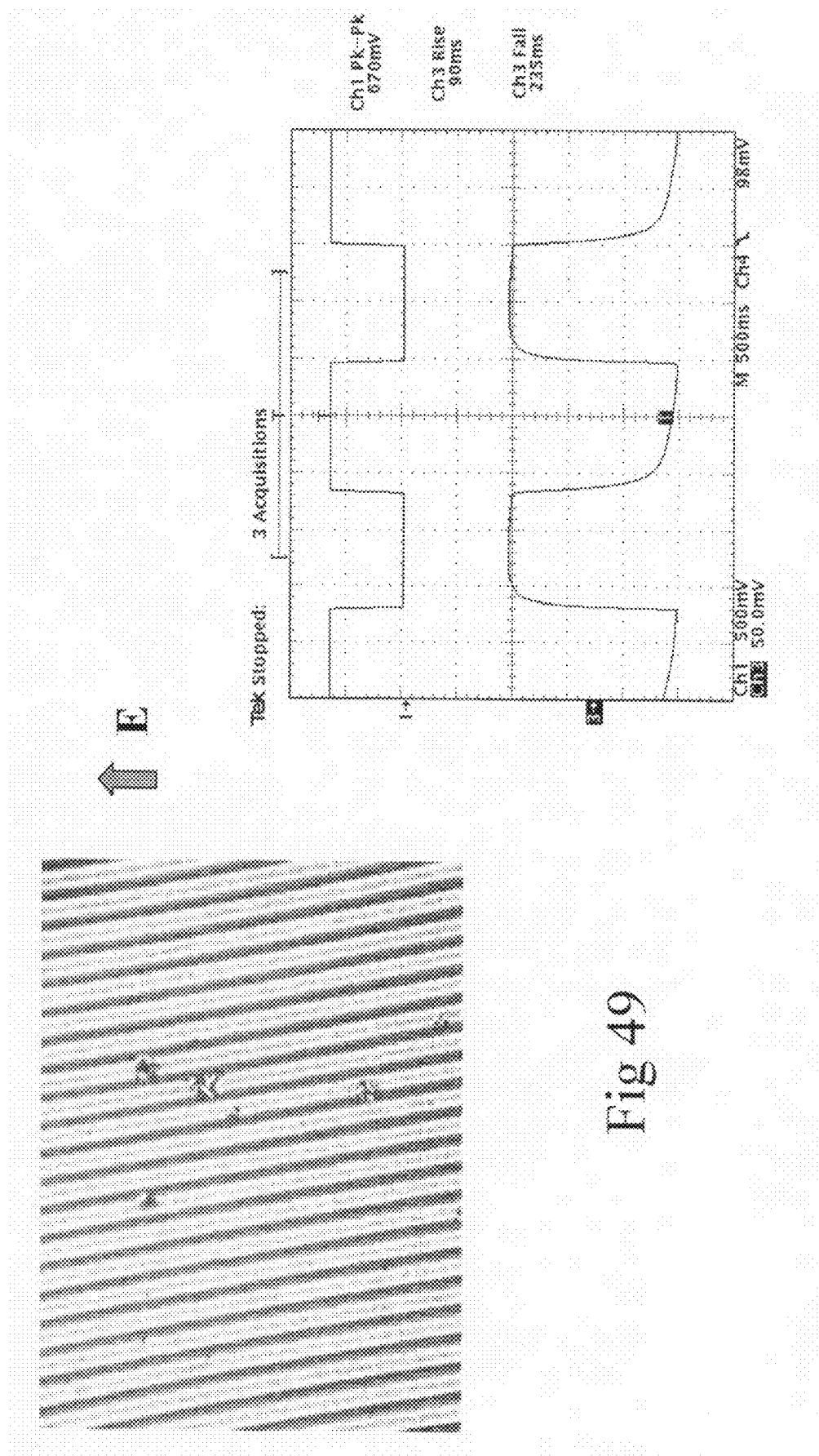
Figure 50:
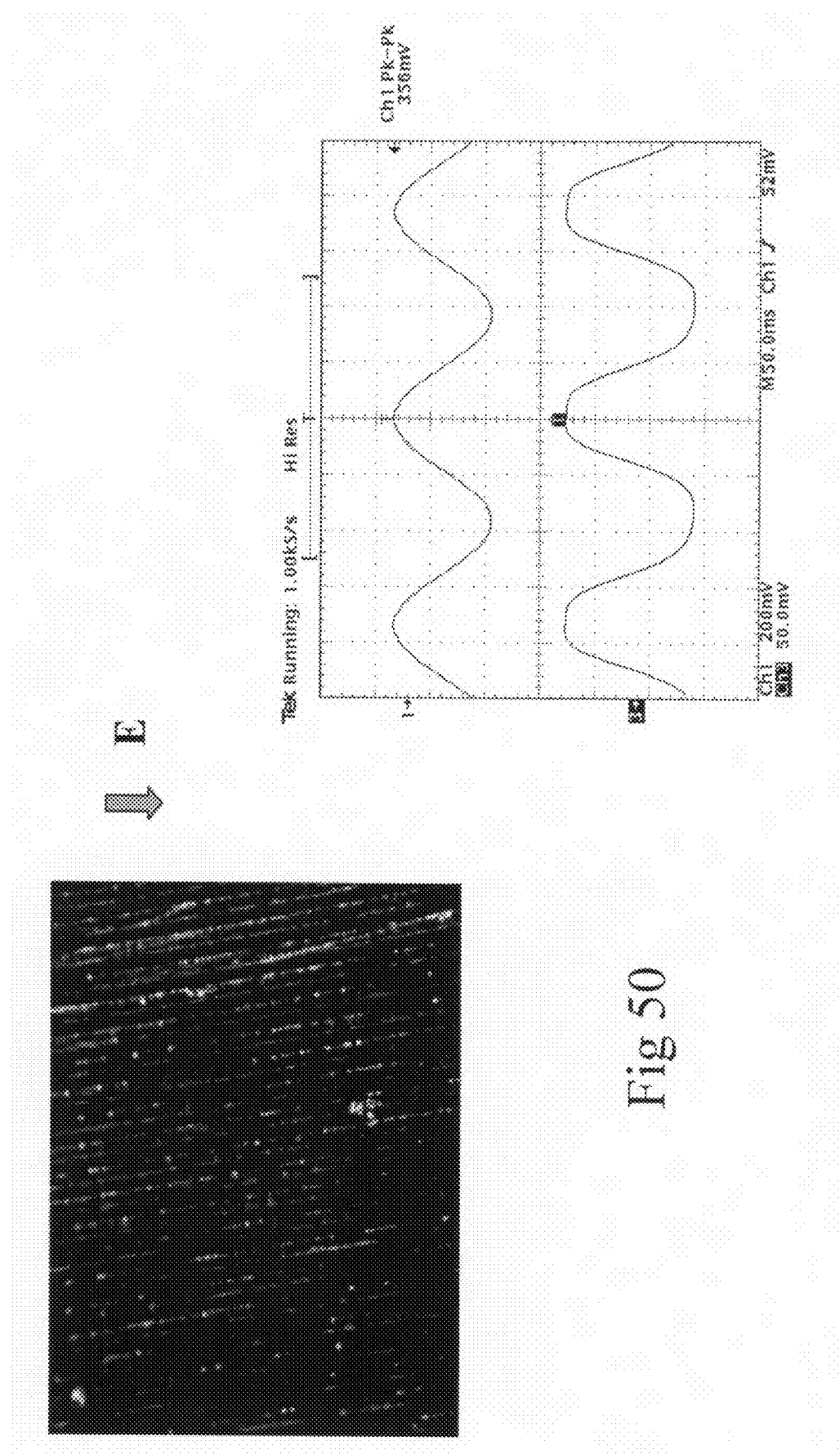

The contrast of the displayed image of the device with the fringe field is shown (see FIG. 49 and FIG. 50) to have a much higher contrast than the image of the device with an electric field generated over the entire bulk layer (FIG. 52).

Moreover, the driving voltage, about 6.7 V, of the device with the fringe-field was much lower than the driving voltage, about 50 V of the device with an electric field generated over the entire bulk layer. (The displayed voltage on the oscilloscope has to be multiplied by a factor 10 due to the character of the measuring device.)

EXAMPLE 8

Cell Comprising Chiral Smectic Alignment Layer and a Comb-Like Electrode for Generating Fringe Field Example 7 is repeated, but the nematic liquid crystalline material exhibits a positive dielectric anisotropy ($\Delta\epsilon>0$) instead.

EXAMPLE 9

Figure 54:
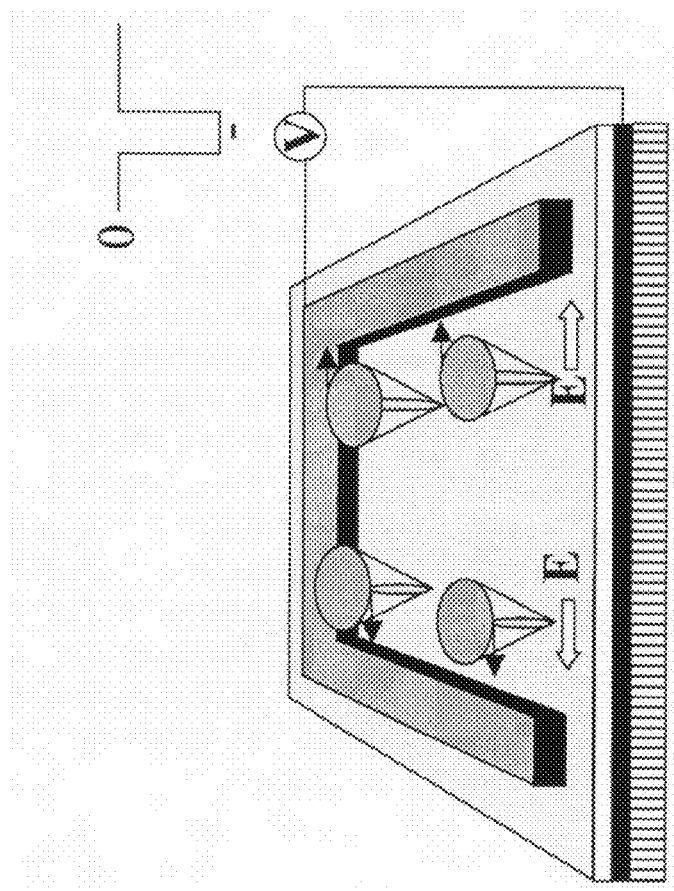
Figure 53:
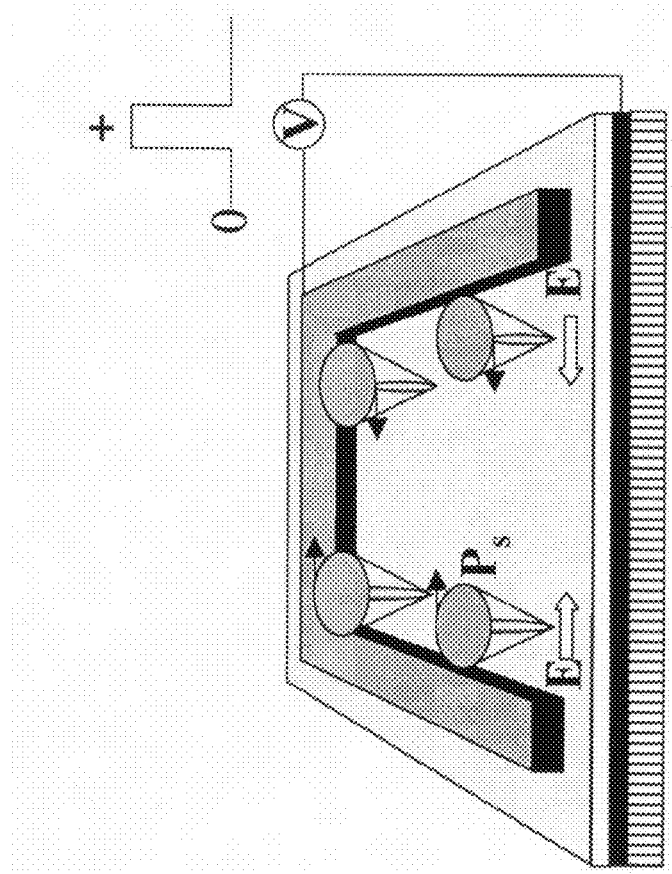

Cell Comprising Chiral Smectic Alignment Layer and a Comb-Like Electrode for Generating Fringe Field Example 7 is repeated, but the FLCP layer is aligned with the smectic layers parallel to the substrate surface instead. The expected switching of the FLCP is shown in FIG. 53 and FIG. 54.

EXAMPLE 10

Cell Comprising Chiral Smectic Alignment Layer and a Comb-Like Electrode for Generating Fringe Field (Double-Sided Device)

Figure 55:
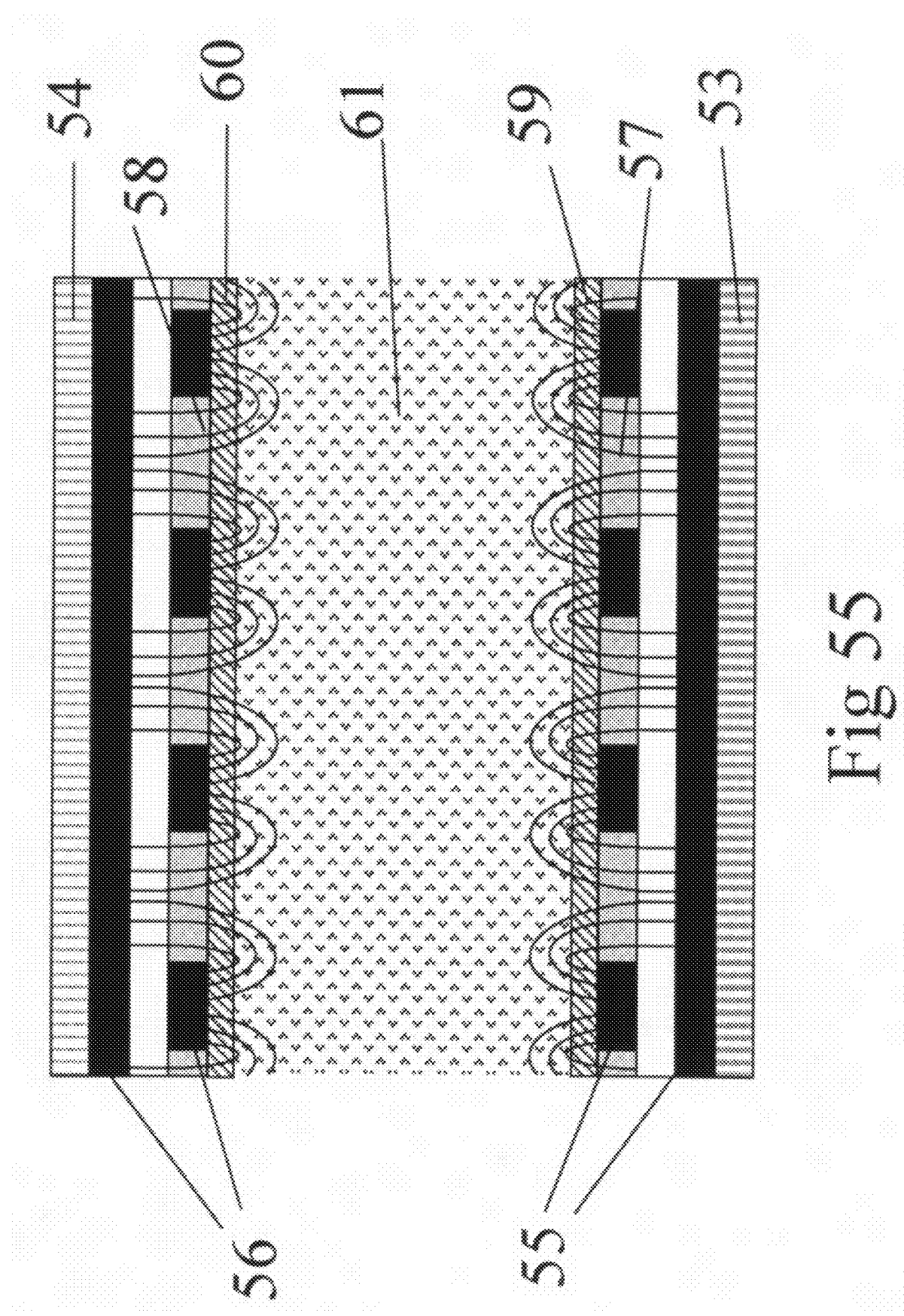

Example 7 is repeated, but each inner surface of the substrates 53 and 54 are bearing the above-disclosed electrode pattern 55 and 56, respectively, (double-sided device) for generating fringe fields near both substrates 53 and 54 (FIG. 55). Moreover, each substrate surface 53 and 54, respectively, comprise a passive alignment layer 57 and 58, respectively, and a FLCP layer 59 and 60, respectively, deposited on each electrode pattern 55 and 56, respectively, and facing the achiral nematic liquid crystalline bulk layer 61.

EXAMPLE 11

Cell Comprising Chiral Smectic Alignment Layer and a Comb-Like Electrode for Generating Fringe Field (Double-Sided Device)

Example 8 is repeated, but both inner surfaces of the substrates are bearing the above-disclosed electrode pattern (double-sided device) for generating fringe fields near both substrate surfaces.

EXAMPLE 12

Cell Comprising Chiral Smectic Sub-Volume and a Comb-Like Electrode for Generating Fringe Field (Double-Sided Device)

Example 7 is repeated, but each inner surface of the substrates are bearing the above-disclosed electrode pattern (double-sided device) and each substrate surface comprise a passive alignment layer. However, instead of coating each alignment layer with a FLCP layer, chiral molecules (chiral dopants) are attached to the alignment layer. Furthermore, the cell gap is filled with an achiral smectic liquid crystalline material. The chiral molecules induces chirality in a sub-volume of the achiral smectic bulk layer and thereby a switchable ferroelectric sub-volume located near the substrate bearing the comb-like electrode.

While the invention has been described in detail and with reference to specific embodiments thereof, it will be apparent for one skilled in the art that various changes and modifications can be made therein without departing from the spirit and scope thereof.

The invention claimed is:

1. A liquid crystal device comprising:
   two confining substrates,
   a liquid crystal bulk layer arranged between said substrates,
   an electrode pattern applied on the inner surface of one of the substrates for generating an inhomogeneous electric field over a first sub-volume of the bulk layer adjacent to said electrode pattern, said electric field being inhomogenous with regard to direction of field lines and strength thereof and comprising electric field lines in directions substantially parallel to said inner surface of said first substrate,
   an optional alignment layer arranged to interact with the bulk layer at a bulk surface thereof and applied on said electrode pattern, said electric field being generated also over said optional alignment layer, and
   liquid crystals in a polarized state comprised in said first sub-volume and/or in said optional alignment layer, a polarization of said liquid crystals being stronger than any possible similar liquid crystal polarization of the bulk layer outside said first sub-volume, said alignment layer and/or a second sub-volume of the bulk layer adjacent the inner surface of the other substrate, or an optional second alignment layer or an optional second electrode pattern applied thereon, and capable of coupling with said electric field to perform switching of said liquid crystals for accomplishing via elastic forces a switching of the liquid crystals of the bulk layer,
   wherein the liquid crystals are in a polarized state in the presence and in the absence of an electric field.

2. A liquid crystal device according to claim 1, wherein a second electrode pattern is applied on the inner surface of the other substrate for generating an inhomogenous electric field also over the second sub-volume of the bulk layer adjacent to said second electrode pattern, or an optional second alignment layer applied thereon, said electric field being inhomogenous with regard to direction of field lines and strength thereof.

3. A liquid crystal device according to claim 2, wherein the coupling between the liquid crystals in polarized state and said electrical field is selected from the group consisting of ferroelectric coupling, antiferroelectric coupling, paraelectric coupling, flexoelectric coupling, and any combination thereof.

4. A liquid crystal device according to claim 1, wherein said polarization in the first sub-volume and/or in said optional alignment layer is stronger than any possible similar liquid crystal polarization of the bulk layer outside said first sub-volume and/or said alignment layer.

5. A liquid crystal device according to claim 4, wherein the coupling between the liquid crystals in polarized state and said electrical field is selected from the group consisting of ferroelectric coupling, antiferroelectric coupling, paraelectric coupling, flexoelectric coupling, and any combination thereof.

6. A liquid crystal device according to claim 1, wherein the coupling between the liquid crystals in polarized state and said electrical field is selected from the group consisting of ferroelectric coupling, antiferroelectric coupling, paraelectric coupling, flexoelectric coupling, and any combination thereof.

7. A liquid crystal device according to claim 6, wherein the coupling between the liquid crystals in polarized state and said electrical field is ferroelectric.

8. A liquid crystal device according to claim 7, wherein said alignment layer comprises a liquid crystalline material exhibiting a spontaneous polarization.

9. A liquid crystal device according to claim 8, wherein said alignment layer comprises a chiral smectic C, SmC*, liquid crystalline material.

10. A liquid crystal device according to claim 7, wherein said sub-volume comprises a liquid crystalline material exhibiting an induced spontaenous polarization.

11. A liquid crystal device according to claim 10, wherein chiral dopants are homogenously distributed in the bulk layer as a result of being permanently attached to at least one surface in said first sub-volume and thereby inducing a local increase of one or more chirality-related physical properties within said first sub-volume causing the appearance of a spontaneous polarisation having a non-homogeneous distribution being maximum at said surface and dropping in a direction away from said surface, said chiral dopants being soluble in the liquid crystal bulk layer.

12. A liquid crystal device according to claim 6, wherein the coupling between the liquid crystals in polarized state and said electrical field is flexoelectric.

13. A liquid crystal device according to claim 12, wherein the liquid crystal bulk layer comprises a nematic liquid crystalline material exhibiting flexoelectric polarisation under elastic deformation thereof.

14. A liquid crystal device according to claim 13, wherein the polarization of the liquid crystals of said first sub-volume is induced by splay and/or bend deformations in the liquid crystal bulk layer caused by said alignment layer having varying anchoring properties and/or protrusions extending into the first sub-volume.

15. A liquid crystal device according to claim 13, wherein the liquid crystal bulk layer exhibits a negative dielectric anisotropy and a splay-bend hybrid deformation, and the liquid crystals of said first sub-volume exhibits a bend deformation.

16. A liquid crystal device according to claim 13, wherein the liquid crystal bulk layer exhibits a positive dielectric anisotropy and a splay-bend hybrid deformation, and the liquid crystals of said first sub-volume exhibits a splay deformation.

17. A liquid crystal device according to claim 13, wherein the liquid crystal bulk layer exhibits a positive dielectric anisotropy and a splay deformation, and an electrode pattern applied on the inner surface of each of the substrates for generating an inhomogenous electric field over each sub-volume of the bulk layer adjacent to said electrode patterns.

18. A liquid crystal device according to claim 13, wherein the liquid crystal bulk layer exhibits a negative dielectric anisotropy and a bend deformation, and an electrode pattern applied on the inner surface of each of the substrates for generating an inhomogenous electric field over each sub-volume of the bulk layer adjacent to said electrode patterns.

19. A liquid crystal device according to claim 1, wherein the electrode pattern comprises interdigitated electrodes.

20. A liquid crystal device according to claim 19, wherein the electrode pattern comprises a first conductive layer arranged on said substrate, an insulating layer arranged on said first conductive layer and a second conductive layer arranged on top of said insulation layer, said second conductive layer having a comb-like form.

21. A liquid crystal device according to claim 19, wherein the electrode pattern comprises a first conductive layer arranged on said substrate, an insulating layer arranged on said first conductive layer and a second conductive layer arranged on top of said insulation layer, said second conductive layer having openings.

22. A liquid crystal device according to claim 1, wherein the electrode pattern comprises fringe-field generating electrodes.

* * * * *